(12) United States Patent
Toyoshi

(10) Patent No.: US 11,829,851 B2
(45) Date of Patent: Nov. 28, 2023

(54) INFORMATION PROCESSOR, MOBILE DEVICE, AND METHOD AND PROGRAM THEREOF

(71) Applicant: SONY CORPORATION, Tokyo (JP)

(72) Inventor: Masahiko Toyoshi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 626 days.

(21) Appl. No.: 16/978,463

(22) PCT Filed: Feb. 13, 2019

(86) PCT No.: PCT/JP2019/005043
§ 371 (c)(1),
(2) Date: Sep. 4, 2020

(87) PCT Pub. No.: WO2019/176420
PCT Pub. Date: Sep. 19, 2019

(65) Prior Publication Data
US 2021/0042554 A1    Feb. 11, 2021

(30) Foreign Application Priority Data

Mar. 13, 2018 (JP) .................................. 2018-045444

(51) Int. Cl.
| | |
|---|---|
| *G06N 5/04* | (2023.01) |
| *G06N 20/00* | (2019.01) |
| *G06V 20/58* | (2022.01) |
| *G06V 20/64* | (2022.01) |
| *G06N 7/01* | (2023.01) |
| *G06V 10/84* | (2022.01) |
| *G06V 20/56* | (2022.01) |

(52) U.S. Cl.
CPC ............... *G06N 20/00* (2019.01); *G06N 5/04* (2013.01); *G06N 7/01* (2023.01); *G06V 10/84* (2022.01);
(Continued)

(58) Field of Classification Search
CPC ............ G06N 20/00; G06N 5/04; G06N 7/01; G06V 10/84; G06V 20/56; G06V 20/58;
(Continued)

(56) References Cited

U.S. PATENT DOCUMENTS

| | | |
|---|---|---|
| 2005/0180602 A1 | 8/2005 | Yang et al. |
| 2011/0221769 A1 | 9/2011 | Leung et al. |

(Continued)

FOREIGN PATENT DOCUMENTS

| | | |
|---|---|---|
| CN | 102656595 A | 9/2012 |
| CN | 106663221 A | 5/2017 |

(Continued)

OTHER PUBLICATIONS

International Search Report and Written Opinion of PCT Application No. PCT/JP2019/005043, dated May 21, 2019, 07 pages of ISRWO.

*Primary Examiner* — Chuong A Ngo
(74) *Attorney, Agent, or Firm* — CHIP LAW GROUP

(57) ABSTRACT

To provide a configuration that enables recognition of an unknown object included in an image. The configuration includes a network creation unit that creates a network linking a scene node indicating a scene type of an image and a node corresponding to an object, and an unknown object inference unit that compares a created network created by the network creation unit with a large number of reference networks created by learning processing, selects reference networks similar to the created network, selects, from the selected reference networks, a node corresponding to a node of an unknown object in the created network, and infers that an object associated with the selected node is an object corresponding to the unknown object.

15 Claims, 14 Drawing Sheets

(52) U.S. Cl.
CPC .............. *G06V 20/56* (2022.01); *G06V 20/58* (2022.01); *G06V 20/647* (2022.01); *G06V 2201/07* (2022.01)

(58) Field of Classification Search
CPC .. G06V 20/647; G06V 2201/07; G06F 18/29; G06F 16/583; G06T 7/00
See application file for complete search history.

(56) References Cited

U.S. PATENT DOCUMENTS

| | | | |
|---|---|---|---|
| 2016/0055409 A1 | 2/2016 | Majumdar et al. | |
| 2018/0174671 A1* | 6/2018 | Cruz Huertas | G16H 10/60 |
| 2018/0300645 A1* | 10/2018 | Segal | G06N 7/02 |
| 2019/0139441 A1* | 5/2019 | Akella | G06T 19/006 |

FOREIGN PATENT DOCUMENTS

| | | |
|---|---|---|
| EP | 1725975 A2 | 11/2006 |
| EP | 3183695 A1 | 6/2017 |
| JP | 2004-505378 A | 2/2004 |
| JP | 2007-524950 A | 8/2007 |
| JP | 2007-323177 A | 12/2007 |
| JP | 2013-513191 A | 4/2013 |
| JP | 2017-531240 A | 10/2017 |
| KR | 10-2012-0093981 A | 8/2012 |
| KR | 10-2017-0044102 A | 4/2017 |
| TW | 201626293 A | 7/2016 |
| WO | 2005/081792 A2 | 9/2005 |
| WO | 2011/112368 A2 | 9/2011 |
| WO | 2016/028446 A1 | 2/2016 |

* cited by examiner

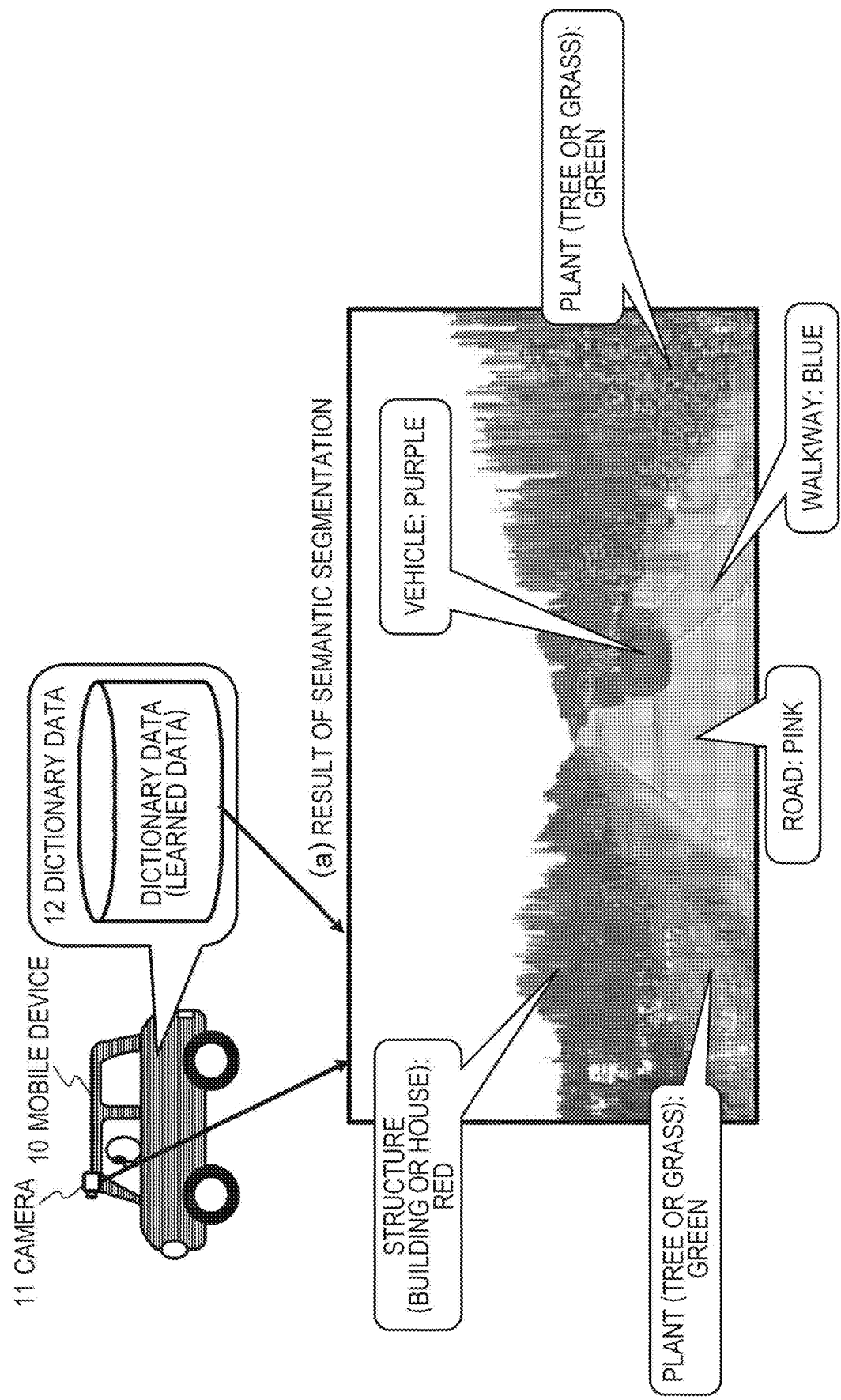

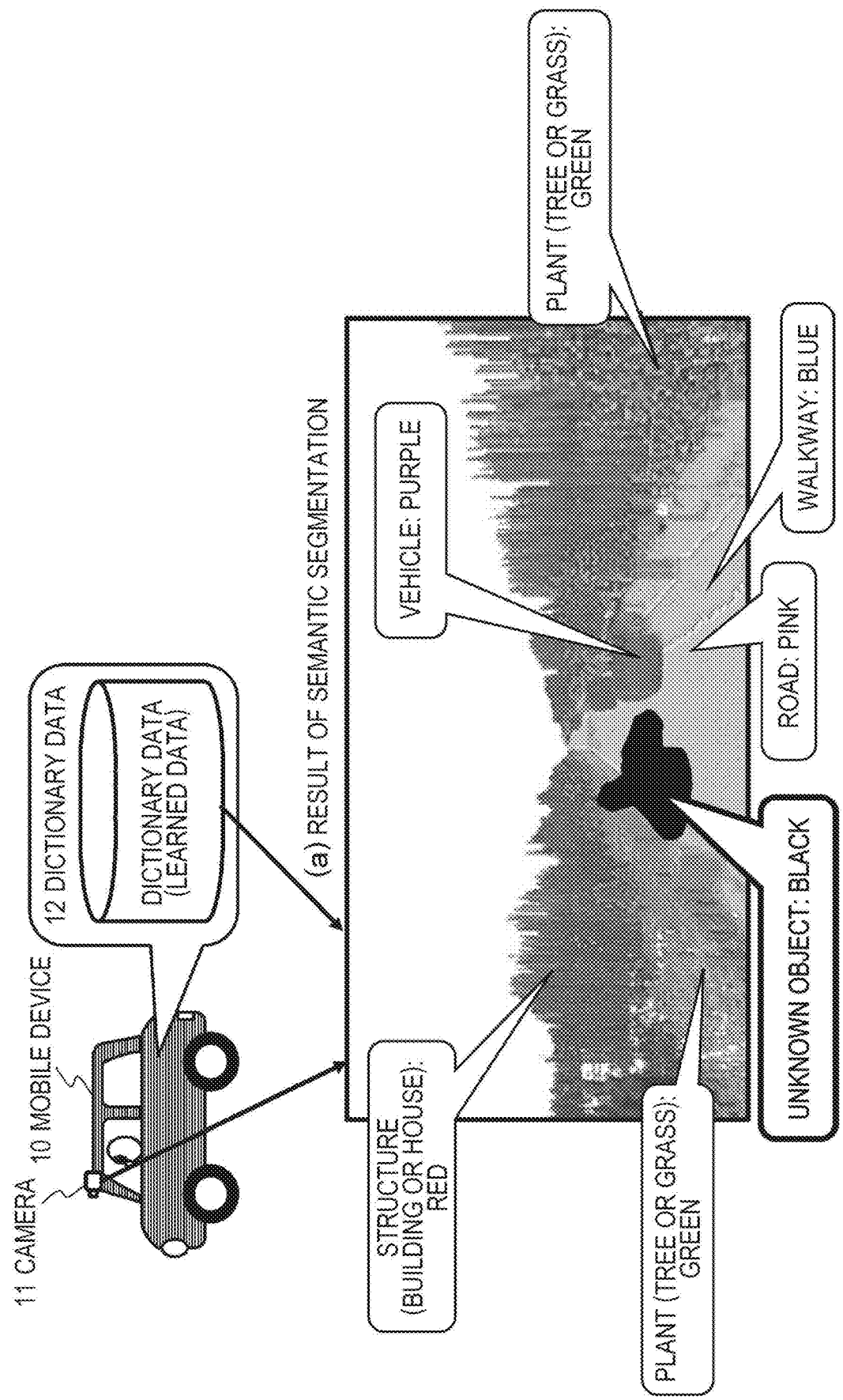

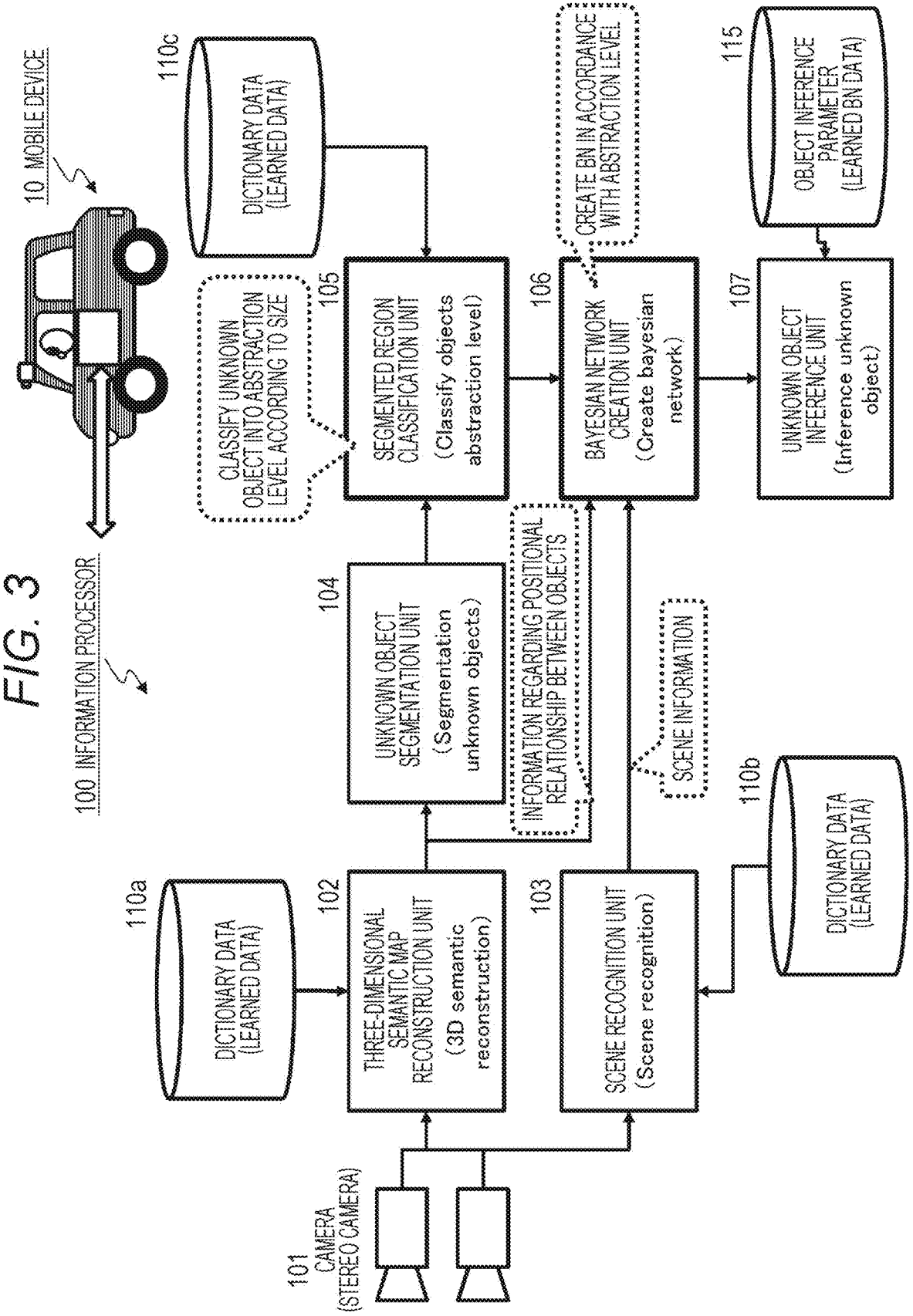

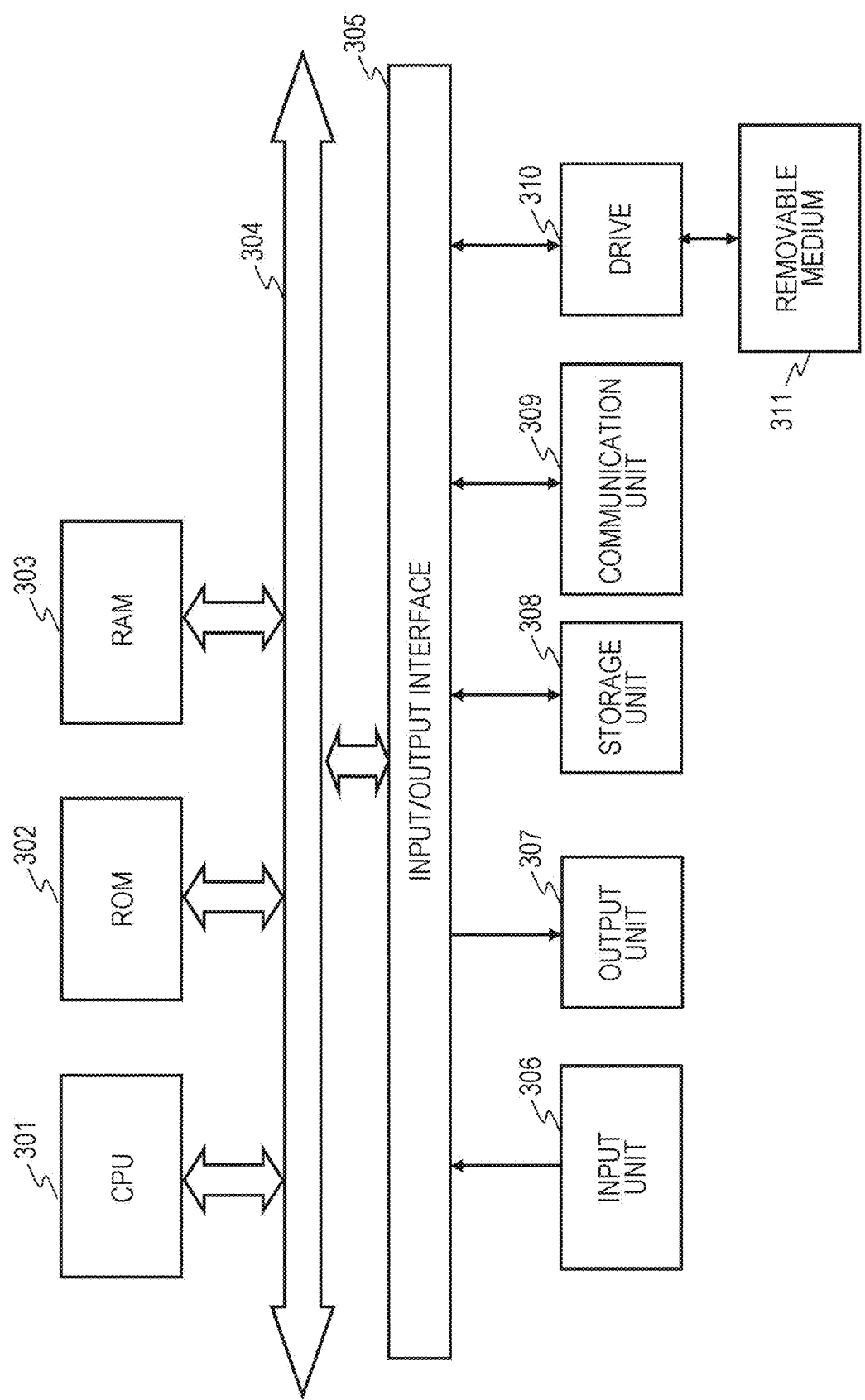

INFORMATION PROCESSOR, MOBILE DEVICE, AND METHOD AND PROGRAM THEREOF

CROSS REFERENCE TO RELATED APPLICATIONS

This application is a U.S. National Phase of International Patent Application No. PCT/JP2019/005043 filed on Feb. 13, 2019, which claims priority benefit of Japanese Patent Application No. JP 2018-045444 filed in the Japan Patent Office on Mar. 13, 2018. Each of the above-referenced applications is hereby incorporated herein by reference in its entirety.

TECHNICAL FIELD

The present disclosure relates to an information processor, a mobile device, and a method and a program thereof. In particular, the present disclosure relates to an information processor, a mobile device, and a method and a program thereof for executing object recognition based on image analysis to enable processing for safely moving a mobile device.

BACKGROUND ART

In recent years, autonomous mobile devices such as self-driving vehicles have been actively developed.

Many of such self-driving vehicles have a configuration in which, for example, an image captured by a camera is analyzed, and if there is an object having a possibility of collision in a traveling direction or the like, recognition is executed to determine what the object is.

For example, semantic segmentation is used as a technology for recognizing what an object in an image is.

Semantic segmentation is a technology for recognizing to which category each of pixels constituting an image belongs on the basis of a degree of matching between an object in the image and dictionary data (learned data) for object recognition based on a variety of actual object shapes and other feature information.

However, this object recognition processing has, as a drawback, a problem in that objects that are not registered as dictionary data cannot be recognized.

On the other hand, there is an inference technology using a Bayesian network as a technology for performing inference for unknown data.

For example, Patent Document 1 (Japanese Unexamined Patent Application Publication (Translation of PCT Application) No. 2004-505378) discloses a configuration in which a Bayesian network is used to classify content such as sounds and images.

CITATION LIST

Patent Document

Patent Document 1: Japanese Unexamined Patent Application Publication (Translation of PCT Application) No. 2004-505378

SUMMARY OF THE INVENTION

Problems to be Solved by the Invention

The present disclosure relates to an information processor, a mobile device, and a method and a program thereof for executing object recognition based on image analysis to safely move a mobile device.

An embodiment of the present disclosure is aimed at providing an information processor, a mobile device, and a method and a program thereof capable of performing, in a case where an unknown object is included in a captured image, inference processing using a Bayesian network to recognize the unknown object.

Solutions to Problems

A first aspect of the present disclosure provides
an information processor including:
a network creation unit that creates a network linking nodes corresponding to objects detected from an image; and
an unknown object inference unit that compares a created network created by the network creation unit with a large number of reference networks created by learning processing, selects reference networks similar to the created network,
selects, from the selected reference networks, a node corresponding to a node of an unknown object in the created network, and infers that an object associated with the selected node is an object corresponding to the unknown object.

Moreover, a second aspect of the present disclosure provides
a mobile device including:
a camera that captures an image;
a network creation unit that creates a network linking nodes corresponding to objects detected from the image captured by the camera;
an unknown object inference unit that compares a created network created by the network creation unit with a large number of reference networks created by learning processing, selects reference networks similar to the created network,
selects, from the selected reference networks, a node corresponding to a node of an unknown object in the created network, and infers that an object associated with the selected node is an object corresponding to the unknown object; and
a control unit that executes driving control on the basis of object information inferred by the unknown object inference unit.

Moreover, a third aspect of the present disclosure provides
an information processing method to be executed in an information processor, the information processing method including:
a network creation step of creating, by a network creation unit, a network linking nodes corresponding to objects detected from an image; and
an unknown object inference step of performing, by an unknown object inference unit,
comparison of a created network created in the network creation step with a large number of reference networks created by learning processing, selection of reference networks similar to the created network,
selection of, from the selected reference networks, a node corresponding to a node of an unknown object in the created network, and inference that an object associated with the selected node is an object corresponding to the unknown object.

Moreover, a fourth aspect of the present disclosure provides an information processing method to be executed in a mobile device, the information processing method including:
an image capturing step of capturing, by a camera, an image;
a network creation step of creating, by a network creation unit, a network linking nodes corresponding to objects detected from the image captured by the camera;
an unknown object inference step of performing, by an unknown object inference unit,
comparison of a created network created in the network creation step with a large number of reference networks created by learning processing, selection of reference networks similar to the created network,
selection of, from the selected reference networks, a node corresponding to a node of an unknown object in the created network, and inference that an object associated with the selected node is an object corresponding to the unknown object; and
a control step of executing, by a control unit, driving control on the basis of object information inferred in the unknown object inference step.

Moreover, a fifth aspect of the present disclosure provides a program that causes information processing to be executed in an information processor, the program including:
a network creation step of causing a network creation unit to create a network linking nodes corresponding to objects detected from an image; and
an unknown object inference step of causing an unknown object inference unit to
compare a created network created in the network creation step with a large number of reference networks created by learning processing, select reference networks similar to the created network,
select, from the selected reference networks, a node corresponding to a node of an unknown object in the created network, and infer that an object associated with the selected node is an object corresponding to the unknown object.

Note that the program of the present disclosure is, for example, a program that can be provided, by a storage medium or a communication medium provided in a computer-readable format, to an information processor or a computer system that can execute a variety of program codes. By providing such a program in a computer-readable format, processing according to the program is performed on the information processor or the computer system.

Other objects, features, and advantages of the present disclosure will become apparent from the detailed description based on the embodiment of the present disclosure and the accompanying drawings described later. Note that, in the present specification, a system is a logical assembly constituted by a plurality of devices, and the devices constituting the assembly are not necessarily contained in the same housing.

Effects of the Invention

A configuration of the embodiment of the present disclosure enables recognition of an unknown object included in an image.

Specifically, for example, the configuration includes a network creation unit that creates a network linking a scene node indicating a scene type of an image and a node corresponding to an object, and an unknown object inference unit that compares a created network created by the network creation unit with a large number of reference networks created by learning processing, selects reference networks similar to the created network, selects, from the selected reference networks, a node corresponding to a node of an unknown object in the created network, and infers that an object associated with the selected node is an object corresponding to the unknown object.

This configuration enables recognition of an unknown object included in an image.

Note that effects described herein are merely illustrative and are not intended to be restrictive, and there may be additional effects.

BRIEF DESCRIPTION OF DRAWINGS

FIG. 1 is a diagram illustrating semantic segmentation.
FIG. 2 is a diagram illustrating a problem in semantic segmentation.
FIG. 3 is a diagram illustrating a configuration example of an information processor of the present disclosure.
FIG. 14 is a diagram illustrating an example of a hardware configuration of the information processor.

MODE FOR CARRYING OUT THE INVENTION

Figures 4A, 4B:
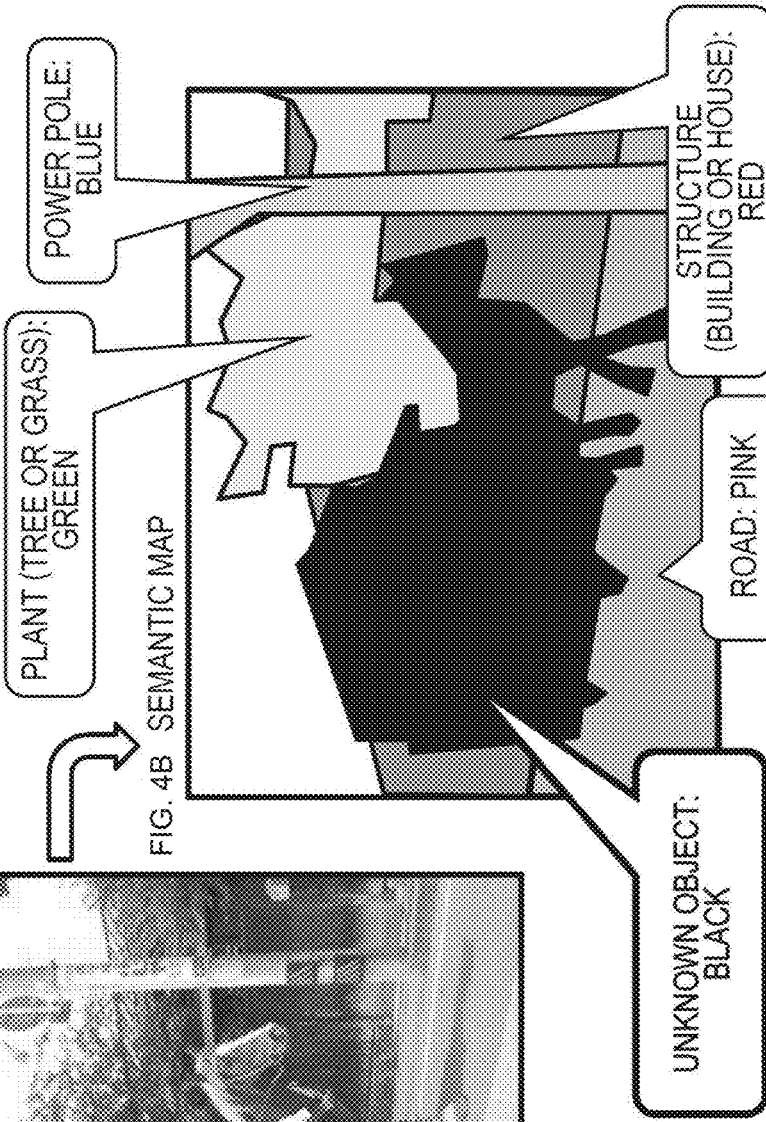
FIGS. 4A and 4B is a are diagrams illustrating processing executed by a three-dimensional semantic map reconstruction unit.

An information processor, a mobile device, and a method and a program thereof of the present disclosure will be described below in detail with reference to the drawings. Note that the description will be made in accordance with the following items.

1. Outline of semantic segmentation and problems therein
2. Configurations and processing of information processor and mobile device of present disclosure
　2-1. Processing executed by camera 100
　2-2. Processing executed by three-dimensional semantic map reconstruction unit 102
　2-3. Processing executed by scene recognition unit 103
　2-4. Processing executed by unknown object segmentation unit 104
　2-5. Processing executed by segmented region classification unit 105
　2-6. Processing executed by Bayesian network creation unit 106
　2-7. Processing executed by unknown object inference unit 107

3. Sequence of processing executed by information processor

4. Example of object inference processing to which Bayesian network has been applied for variety of unknown objects 5. Configuration example of information processor 6. Summary of configuration of present disclosure

[1. Outline of Semantic Segmentation and Problems Therein]

First, an outline of semantic segmentation and problems therein will be described.

In a case where self-driving is performed, for example, an image captured by a camera is analyzed, and object recognition processing is executed to determine what an object in a traveling direction is.

Semantic segmentation is one of technologies for recognizing to which category each of pixels constituting an image belongs.

The outline of semantic segmentation and problems therein will be described with reference to FIG. 1 and the following drawings.

FIG. 1 illustrates an image illustrating an example of a result of semantic segmentation of an image captured by a camera 11 that is included in a mobile device 10 such as a car and captures an image ahead.

Note that the image in the diagram is illustrated as a monochrome image, but it is actually a color image.

Semantic segmentation is a technology for performing object recognition to determine what an object in an image is on the basis of a degree of matching between the object in the image and dictionary data (learned data) for object recognition based on a variety of actual object shapes and other feature information.

Dictionary data 12 illustrated in FIG. 1 is stored in a storage unit in an information processor included inside the mobile device 10.

The dictionary data 12 is dictionary data (learned data) for object recognition based on a variety of actual object shapes and other feature information.

A data processing unit of the information processor inside the mobile device 10 performs object recognition to determine what an object in an image is on the basis of a degree of matching between the dictionary data 12 and the object in the image.

As a result, an image color-coded by types of objects illustrated in FIG. 1 is created.

The image illustrated in FIG. 1 is color-coded by types of objects as described below.

Structure (building or house): red
Vehicle: purple
Plant (tree or grass): green
Road: pink
Walkway: blue These are results of color-coding by types of objects recognized on the basis of the dictionary data 12.

For example, in a case of self-driving or the like, such object recognition results can be used to recognize an object or the like in a traveling direction that has a possibility of collision for safe traveling.

In the example illustrated in FIG. 1, all objects included in the image are recognized on the basis of the dictionary data 12.

However, this object recognition processing has, as a drawback, a problem in that objects that are not registered as dictionary data cannot be recognized.

FIG. 2 illustrates an example of a result of semantic segmentation processing in a case where a camera-captured image includes an object that is not registered as dictionary data.

In a case where a camera-captured image includes an object that is not registered as dictionary data, the unknown object is output as a special fixed color, for example, black.

In a case where such an unknown object has been detected, for example, a self-driving automobile needs to be stopped. Thereafter, the camera-captured image needs to be transmitted to a remote control center for visual determination of what the unknown object is, and the self-driving automobile needs to start traveling again in accordance with the determination.

In a case where such unknown objects appear one after another, self-driving becomes virtually impossible.

The present disclosure solves such a problem, and provides a configuration in which, even in a case where a camera-captured image includes an object that is not registered as dictionary data, it is possible to infer what the unknown object is.

The configuration and processing of the present disclosure will be described below.

[2. Configurations and Processing of Information Processor and Mobile Device of Present Disclosure]

The configurations and processing of the information processor and the mobile device of the present disclosure will be described with reference to FIG. 3 and the following drawings.

FIG. 3 is a block diagram illustrating a configuration example of an information processor 100 configured inside the mobile device 10 of the present disclosure.

As illustrated in FIG. 3, the information processor 100 includes a camera (stereo camera) 101, a three-dimensional semantic map reconstruction unit 102, a scene recognition unit 103, an unknown object segmentation unit 104, a segmented region classification unit 105, a Bayesian network (BN) creation unit 106, and an unknown object inference unit 107.

Moreover, the information processor 100 has dictionary data (learned data) 110a to 110c and an object inference parameter (learned BN data) 115.

These are stored in a storage unit of the information processor 100.

The dictionary data (learned data) 110a to 110c may be common dictionary data or individual dictionary data.

Specific examples of processing executed by the corresponding components will be sequentially described below.

(2-1. Processing Executed by Camera 100)

First, the camera (stereo camera) 101 captures images in a traveling direction of the mobile device 10 from two different viewpoints.

That is, images from different viewpoints necessary to create a parallax image or a three-dimensional (3D) image are created.

By using a parallax image or a 3D image, a distance to each object can be calculated. That is, a distance from the mobile device 10 to each object can be calculated.

(2-2. Processing Executed by Three-Dimensional Semantic Map Reconstruction Unit 102)

Next, processing executed by the three-dimensional semantic map reconstruction unit 102 will be described with reference to FIGS. 4A and 4B.

The three-dimensional semantic map reconstruction unit 102 executes the semantic segmentation described with reference to FIGS. 1 and 2 on a parallax image or a 3D image obtained from images captured by the camera (stereo camera) 101. The three-dimensional semantic map reconstruction unit 102 uses a result of semantic segmentation on a two-dimensional image and the parallax image obtained from the stereo camera to build a three-dimensional semantic map. That is, an image color-coded by types of objects in the image is created.

As previously described, semantic segmentation is a technology for performing object recognition to determine what an object in an image is on the basis of a degree of matching between the object in the image and dictionary data (learned data) for object recognition based on a variety of actual object shapes and other feature information.

The dictionary data (learned data) 110*a* illustrated in FIGS. 3, 4A, and 4B is dictionary data stored in the storage unit in the information processor 100.

The dictionary data 110*a* is dictionary data (learned data) for object recognition based on a variety of actual object shapes and other feature information.

The three-dimensional semantic map reconstruction unit 102 combines a result of semantic segmentation based on the dictionary data (learned data) 110*a* on a two-dimensional image with a parallax image obtained from stereo images to reconstruct a three-dimensional semantic map (semantic reconstruction). That is, an image color-coded by types of objects is created.

Note that, in FIGS. 4A and 4B and the following drawings, a two-dimensional image is used for the sake of simplicity of description, but the actual processing is executed using a three-dimensional image from which distance information can be acquired.

The three-dimensional semantic map reconstruction unit 102 performs object recognition to which the dictionary data (learned data) 110*a* has been applied on an image (camera-captured image) illustrated in FIG. 4A to reconstruct a semantic map (semantic segmentation image) illustrated in FIG. 4B.

The semantic map (semantic segmentation image) illustrated in FIG. 4B is color-coded according to the following object types.

Plant (tree or grass): green
Power pole: blue
Structure (building or house): red
Road: pink
Unknown object: black Objects colored in colors other than black, that is, a plant (tree or grass), a power pole, a structure (building or house), and a road, are objects for which object recognition has been successfully performed on the basis of data registered as the dictionary data (learned data) 110*a*.

However, objects colored in black are unknown objects, that is, objects for which object recognition based on data registered as the dictionary data (learned data) 110*a* has failed.

Object recognition information of objects, excluding unknown objects, acquired on the basis of a semantic map (semantic segmentation image) reconstructed by the three-dimensional semantic map reconstruction unit 102 and positional relationship information of the objects are output to the Bayesian network creation unit 106.

Furthermore, in a case where an unknown object has been detected, a semantic map (semantic segmentation image) including information regarding a region where the unknown object has been detected is output to the unknown object segmentation unit 104.

(2-3. Processing Executed by Scene Recognition Unit 103)

Next, processing executed by the scene recognition unit 103 will be described.

The scene recognition unit 103 performs scene type recognition, that is, scene recognition processing (scene recognition) based on a three-dimensional image obtained from an image captured by the camera (stereo camera) 101.

Specifically, a type of scene in the image captured by the camera (stereo camera) 101, that is, a scene type is recognized on the basis of data registered as the dictionary data (learned data) 110*b*.

For example,
scene: street,
scene: country road,
scene: railroad crossing,
scene: highway, and
scene: inside tunnel.

For example, which of these scene types the image captured by the camera (stereo camera) 101 falls into is recognized.

The data registered as the dictionary data (learned data) 110*b* is used as reference data for this scene recognition processing.

The dictionary data (learned data) 110*b* is registered data such as image data of a variety of scenes that have been imaged in advance or feature data of images of each scene.

Note that scenes may be further classified.

For example,
scene: paved road,
scene: gravel road,
scene: two-lane road,
scene: four-lane road,
scene: six-lane road,
scene: uphill, and
scene: downhill.

For example, such a scene determination may be performed.

The scene recognition unit 103 compares the image captured by the camera (stereo camera) 101 with the data registered as the dictionary data (learned data) 110*b*, and determines a scene of registered data most similar to the captured image as the scene of the captured image.

Information regarding scene determination by the scene recognition unit 103 is output to the Bayesian network creation unit 106.

(2-4. Processing Executed by Unknown Object Segmentation Unit 104)

Next, processing executed by the unknown object segmentation unit 104 will be described with reference to FIG. 5.

The unknown object segmentation unit 104 executes object segmentation processing (segmentation unknown objects) on an object on which the three-dimensional semantic map reconstruction unit 102 has failed to perform object recognition, that is, the unknown object colored in black in the semantic map (semantic segmentation image) illustrated in FIG. 4B.

A specific example of the object segmentation processing (segmentation unknown objects) for an unknown object executed by the unknown object segmentation unit 104 will be described with reference to FIG. 5.

The unknown object segmentation unit 104 segments a region of the unknown object colored in black in the semantic map (semantic segmentation image) illustrated in FIG. 4B into individual objects included in the region.

Figure 5:
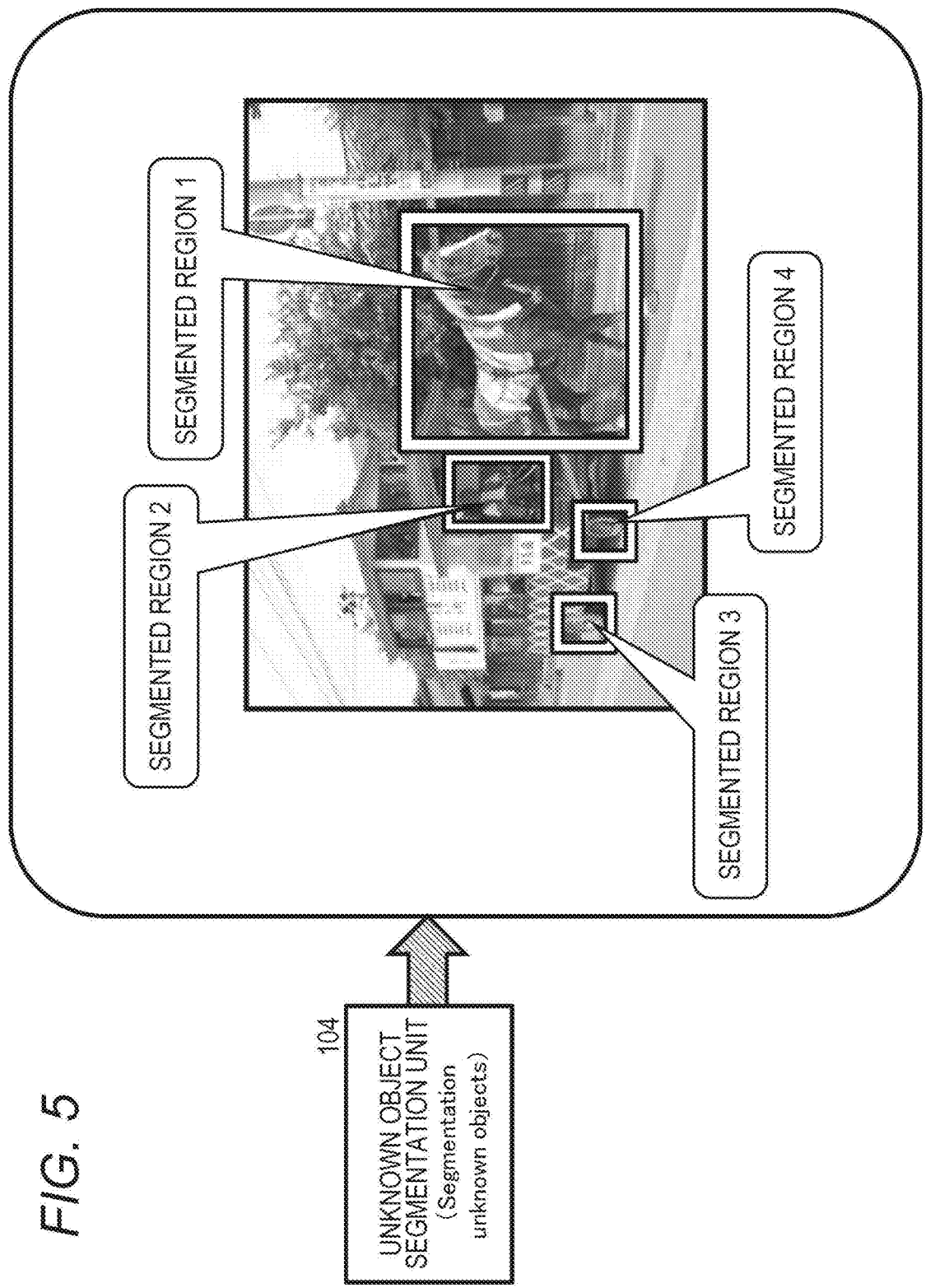
FIG. 5 is a diagram illustrating processing executed by an unknown object segmentation unit.

Specifically, in the example illustrated in FIG. 5, the unknown object region colored in black includes individual objects such as a horse, a human, and a tire.

The unknown object segmentation unit 104 segments the unknown object region colored in black into regions of these individual objects.

Note that the region is segmented on the basis of, for example, image edge information, color information, and the like.

As a specific method, mean shift method, graph cut method, or the like can be applied.

In the example illustrated in FIG. 5, four segmented regions, segmented regions 1 to 4 are set from the unknown object region.

This segmentation information is output to the segmented region classification unit 105 together with a camera-captured image.

(2-5. Processing Executed by Segmented Region Classification Unit 105)

Next, processing executed by the segmented region classification unit 105 will be described with reference to FIG. 6.

The segmented region classification unit 105 executes object recognition processing on each of the segmented regions of the unknown object created by the unknown object segmentation unit 104.

Figure 6:
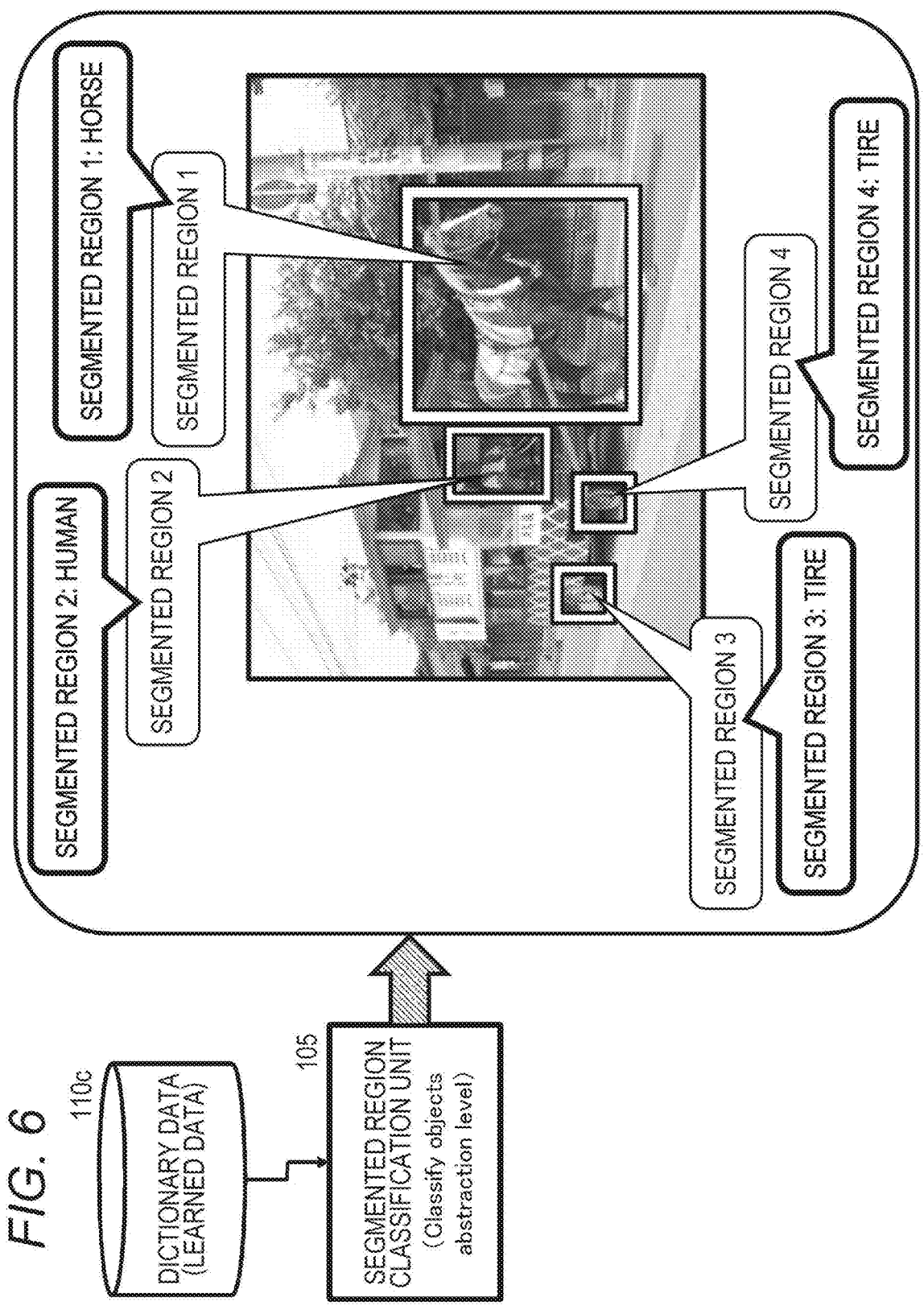
FIG. 6 is a diagram illustrating processing executed by a segmented region classification unit.

As illustrated in FIG. 6, the segmented region classification unit 105 performs object recognition to which the dictionary data (learned data) 110c has been applied, for the objects of the corresponding segmented regions of the unknown object created by the unknown object segmentation unit 104.

Note that, when the object recognition processing is performed on the objects of the corresponding segmented regions of the unknown object, it is preferable to convert the objects of the corresponding segmented regions into two-dimensional images.

It is because the amount of available dictionary data differs. Compared with the number of pieces of available dictionary data of three-dimensional images, the amount of available dictionary data of two-dimensional images is enormous.

Thus, images of the objects of the corresponding segmented regions of the unknown object are converted into two-dimensional images, and then object recognition is performed using an enormous number of pieces of two-dimensional image dictionary data. This processing enables highly accurate object recognition.

In this case, the dictionary data (learned data) 110c is dictionary data of two-dimensional images.

However, in a case where a sufficient number of pieces of three-dimensional image dictionary data has been acquired, object recognition may be performed using a three-dimensional image as it is.

In this case, dictionary data similar to the dictionary data (learned data) 110a used by the three-dimensional semantic map reconstruction unit 102 to reconstruct the semantic map (semantic segmentation image) illustrated in FIG. 4B can be used as the dictionary data (learned data) 110c.

The segmented region classification unit 105 performs object recognition on the four segmented regions, segmented regions 1 to 4 set in the unknown object region, and creates the following object recognition results.

Segmented region 1: horse
Segmented region 2: human
Segmented region 3: tire
Segmented region 4: tire The object recognition results of the corresponding segmented regions 1 to 4 set in the unknown object region created by the segmented region classification unit 105 are output to the Bayesian network creation unit 106.

(2-6. Processing Executed by Bayesian Network Creation Unit 106)

Next, processing executed by the Bayesian network creation unit 106 will be described with reference to FIG. 7.

The Bayesian network creation unit 106 inputs the following types of information.

(1) Scene information determined by the scene recognition unit 103

(2) Object recognition information of objects, excluding an unknown object, created by the three-dimensional semantic map reconstruction unit 102, and positional relationship information of the objects (3) Object recognition information of the unknown object created by the segmented region classification unit 105

The Bayesian network creation unit 106 creates, by applying these types of information, a network constituted by a scene node corresponding to a scene type, and object nodes one each for the recognized objects and the unknown object. Specifically, for example, a Bayesian network is created (create baysian network).

A Bayesian network is constituted by a plurality of nodes, and defines relevance between the nodes. For example, a Bayesian network is a network in which a dependency relationship between random variables is expressed in the form of a directed graph, and is, for example, a directed graph in which events are indicated by nodes and causal relationships between the events are indicated by links.

Figure 7:
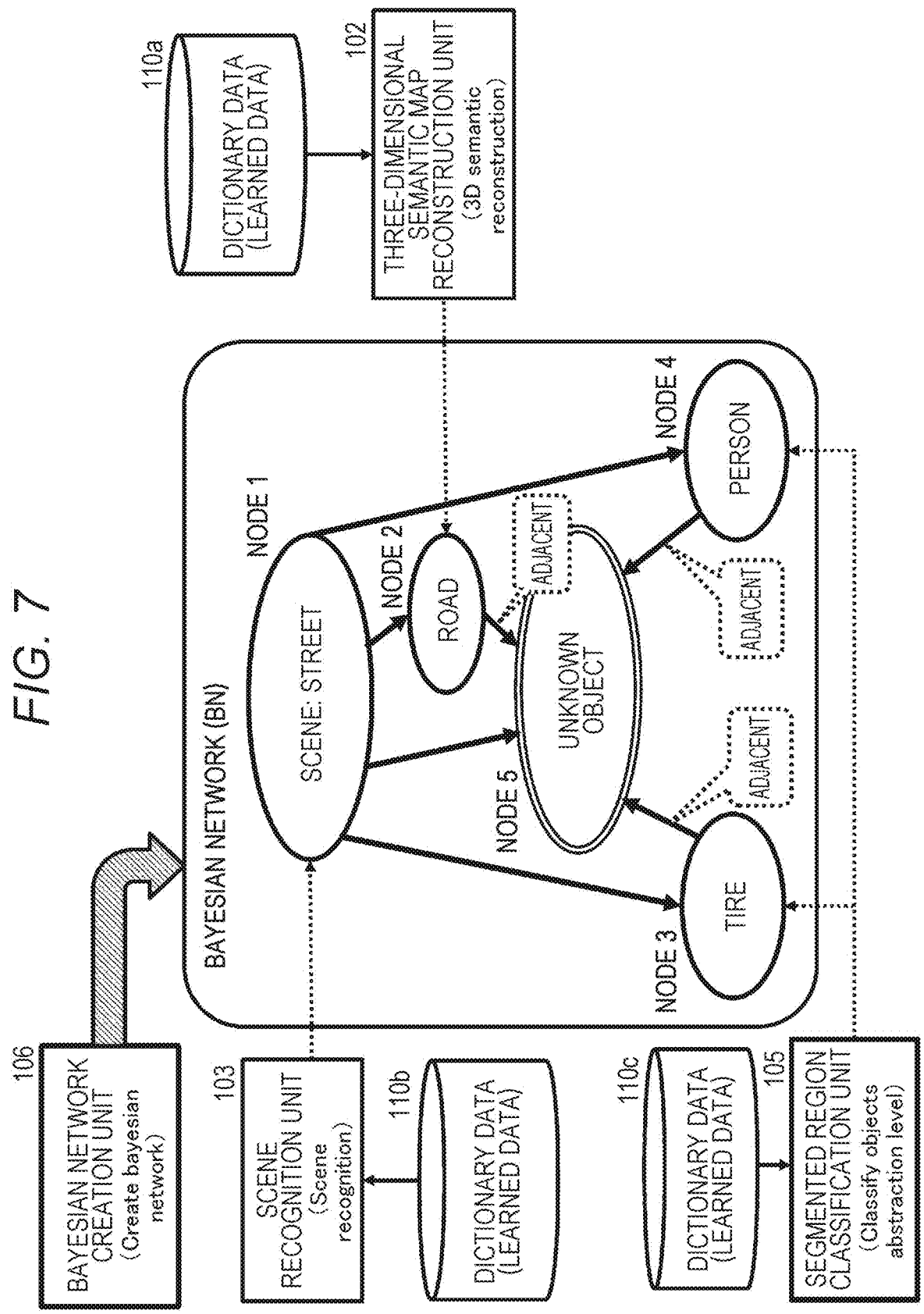
FIG. 7 is a diagram illustrating processing executed by a Bayesian network creation unit.

FIG. 7 illustrates an example of a Bayesian network created by the Bayesian network creation unit 106.

The Bayesian network illustrated in FIG. 7 has five nodes, node 1 to node 5.

"Node 1: scene: street" is scene information determined by the scene recognition unit 103, and this scene information is set as a top node.

"Node 2: road" is a node corresponding to an object recognized by the three-dimensional semantic map reconstruction unit 102.

"Nodes 3 to 5: tire, person, unknown object" are nodes based on object recognition information of the unknown object created by the segmented region classification unit 105.

The Bayesian network creation unit 106
sets a scene node as a source node (node 1),
an unknown object as an end node (node 5), and
an intermediate node as a node of a recognized object, and
creates a network that connects the nodes on the basis of positional relationships (adjacency relationships) between the objects.

In the example illustrated in FIG. 7,
"node 1: scene: street" is scene information determined by the scene recognition unit 103, and this scene information is set as a top node.

Other nodes 2 to 5 are objects included in this scene, and are all connected by arrows output from the scene node.

Moreover, the road (node 2), the tire (node 3), and the person (node 4), which are recognized objects, are all adjacent to the unknown object (node 5), and are therefore connected by arrows directed (links) from the road (node 2), the tire (node 3), and the person (node 4) to the unknown object (node 5).

Note that, in this example, the Bayesian network creation unit 106 uses information regarding positional relationships between objects to set arrows (links) between the objects. Alternatively, the Bayesian network creation unit 106 may be configured to set arrows (links) taking into consideration sizes of objects or abstraction levels, for example. Note that an abstraction level is determined on the basis of a scale of an object obtained from stereo images, for example.

The Bayesian network created by the Bayesian network creation unit 106 is output to the unknown object inference unit 107.

(2-7. Processing Executed by Unknown Object Inference Unit 107)

Next, processing executed by the unknown object inference unit 107 will be described with reference to FIG. 8.

The unknown object inference unit 107 inputs a network created by the Bayesian network creation unit 106, that is, a network in which nodes corresponding to objects detected from an image are linked, and on the basis of this network, infers what an unknown object is.

Specifically, for example, a Bayesian network created by the Bayesian network creation unit 106 is input, and what an unknown object is, is inferred on the basis of this Bayesian network.

This inference processing is executed using the object inference parameter (learned BN data) 115.

The object inference parameter (learned BN data) 115 is a network created by learning processing executed in advance for a variety of objects, for example, a variety of objects such as a car, a human, or a bicycle.

That is, the object inference parameter (learned BN data) 115 is a network in which nodes corresponding to objects inferred to be detected from an image are linked, and is a reference network constituted by nodes corresponding to recognized objects and a scene node indicating a scene type.

Specifically, it is reference BN (Bayesian network) data in which a variety of objects, for example, a variety of objects such as a car, a human, or a bicycle, are expressed as a Bayesian network similar to the one described with reference to FIG. 7.

It is data created by learning processing executed in advance.

The object inference parameter (learned BN data) 115 is reference BN data constituted by a Bayesian network in which a scene node corresponding to a scene type is set as a start node, a variety of objects such as a car, a human, or a bicycle are set as end nodes, and arrows are set on the basis of positional relationships (adjacency relationships) between node objects.

The unknown object inference unit 107 compares a Bayesian network created by the Bayesian network creation unit 106 with reference BN (Bayesian network) data registered in the storage unit as the object inference parameter (learned BN data) 115.

The unknown object inference unit 107 acquires reference BN (Bayesian network) data most similar to the Bayesian network created by the Bayesian network creation unit 106, and infers that an object set as an end node of the acquired reference BN (Bayesian network) data is an object corresponding to the unknown object.

Figure 8:
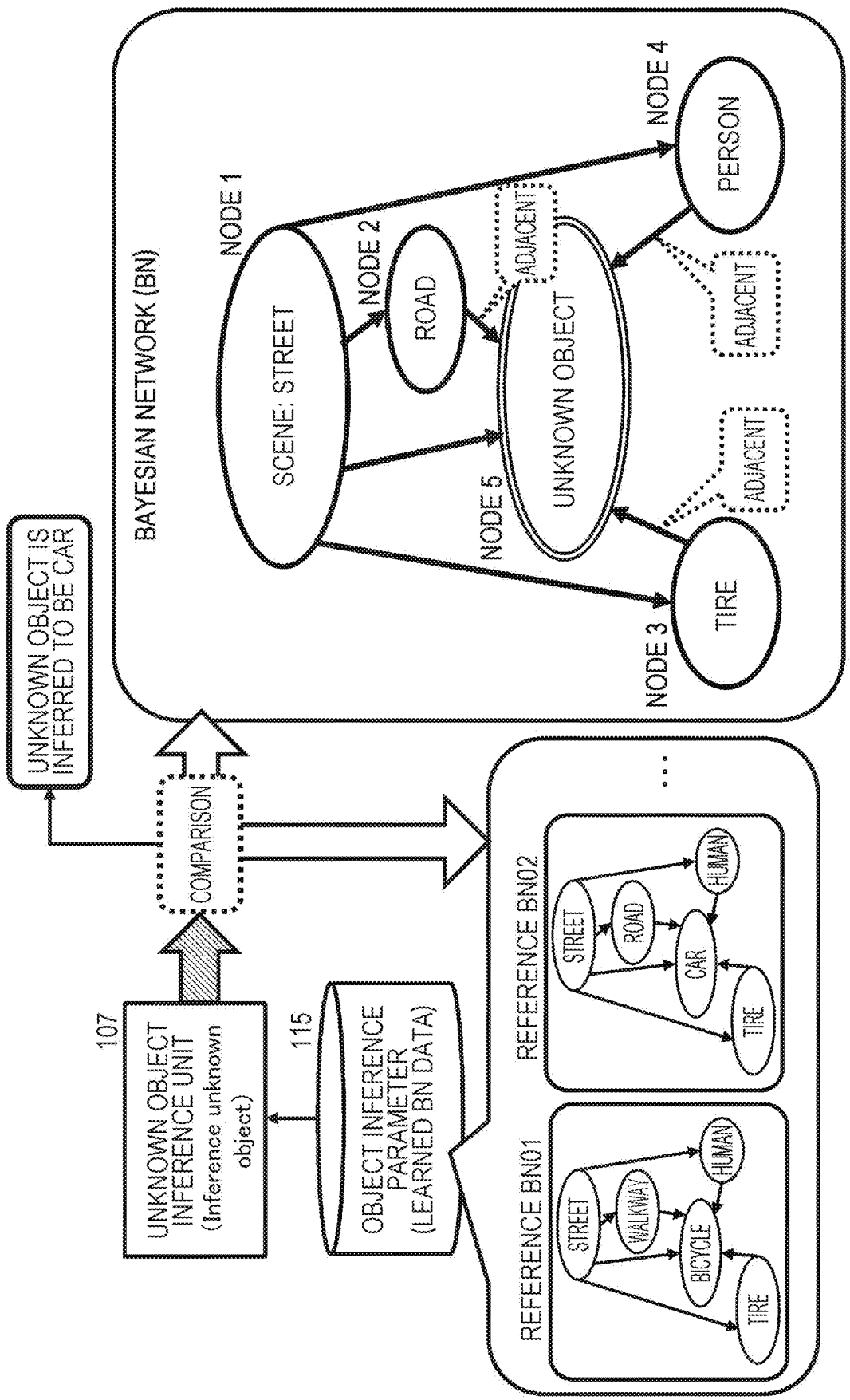
FIG. 8 is a diagram illustrating processing executed by an unknown object inference unit.

For example, in an example illustrated in FIG. 8, among reference BNs in the object inference parameter (learned BN data) 115, a reference BN 02 is most similar to the Bayesian network created by the Bayesian network creation unit 106, that is, a Bayesian network having the following node configuration:
start node: node 1: street (scene),
node 2: road,
node 3: tire,
node 4: person, and
end node: node 5: unknown object.

As illustrated in FIG. 8, the reference BN 02 has a node configuration set as described below.
Start node: node 1: street (scene)
Node 2: road
Node 3: tire
Node 4: person
End node: node 5: car The object set as the end node of this reference BN 02 is a car. The unknown object inference unit 107 infers that the object corresponding to the unknown object is a car.

In this way, the unknown object inference unit 107 acquires a reference BN most similar to the Bayesian network created by the Bayesian network creation unit 106, and infers that the object set as the end node of the acquired reference BN is the object corresponding to the unknown object.

In the example illustrated in FIG. 8, the unknown object inference unit 107 infers that the unknown object is a "car".

In this processing, according to the configuration of the present disclosure, a Bayesian network including scene information is created, which allows for optimal object recognition based on the scene.

As previously described, scenes can be classified into a variety of scenes as described below, and this enables optimal object recognition based on each of these scenes.
Scene: street
Scene: country road
Scene: railroad crossing
Scene: highway
Scene: inside tunnel
Scene: paved road
Scene: gravel road
Scene: two-lane road
Scene: four-lane road
Scene: six-lane road
Scene: uphill
Scene: downhill Note that object recognition information obtained as a result of the object inference processing by the unknown object inference unit 107 is output to, for example, a traveling control unit for self-driving, and traveling control is performed in accordance with a recognized object.

For example, in a case where it is inferred that the unknown object is a vehicle, the following traveling control is performed.

In a case where the object is stationary, it may start moving, so it is avoided to pass close by the object.

In a case where the object is moving, a route by which the object is expected to move is predicted, and the control is performed to set a course to a position away from the predicted route.

For example, such traveling control is performed.

[3. Sequence of Processing Executed by Information Processor]

Next, a sequence of processing executed by the information processor will be described with reference to a flowchart illustrated in FIG. 9.

Figure 9:
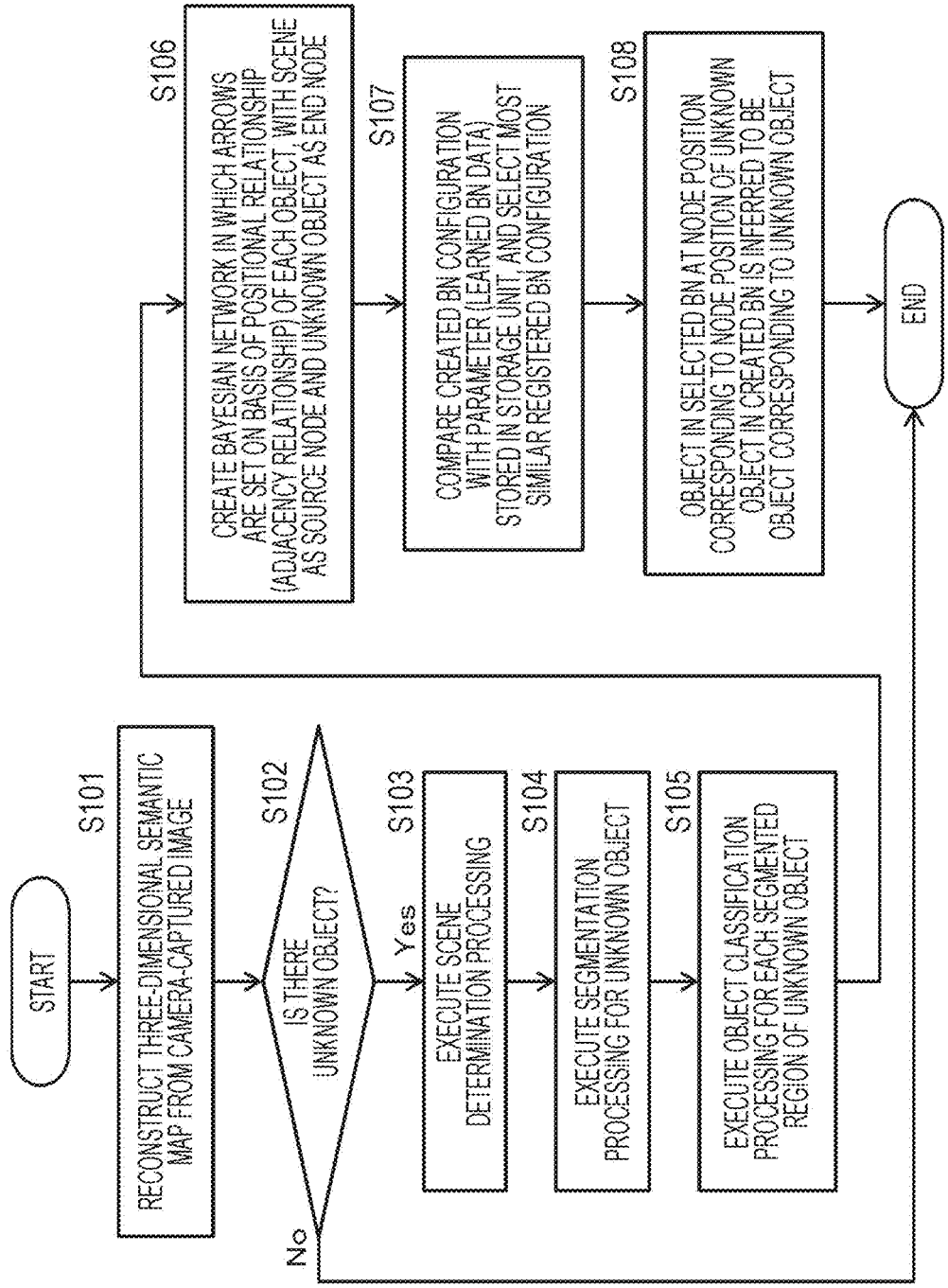
FIG. 9 is a flowchart illustrating a sequence of processing executed by the information processor.

The processing in accordance with the flowchart illustrated in FIG. 9 can be executed by, for example, the data processing unit of the information processor in accordance with a program stored in the storage unit.

The data processing unit includes, for example, hardware having a program execution function such as a CPU.

Processing in each step of the flowchart will be described below.

(Step S101)

First, in step S101, the information processor reconstructs a three-dimensional semantic map from camera-captured images.

This processing is executed by the three-dimensional semantic map reconstruction unit 102 illustrated in FIG. 3.

The three-dimensional semantic map reconstruction unit 102 executes the semantic segmentation described previously with reference to FIGS. 1 and 2. That is, an image color-coded by types of objects in the image is created. Specifically, a result of semantic segmentation based on the dictionary data (learned data) 110a on a two-dimensional image is combined with a parallax image obtained from stereo images to reconstruct a three-dimensional semantic map (semantic reconstruction). As a result, an image color-coded by types of objects is created.

The three-dimensional semantic map reconstruction unit 102 performs, on the basis of a degree of matching between the dictionary data (learned data) 110a and an object in the image, object recognition (3D semantic reconstruction) to determine what the object in the image is, and reconstructs a semantic map (semantic segmentation image) that is color-coded by types of objects.

(Step S102)

Next, in step S102, the information processor determines whether or not the semantic map (semantic segmentation image) reconstructed in step S101 includes an unknown object.

If an unknown object is not included, the processing ends.

In this case, all the objects included in the image have been successfully recognized, and it is not necessary to perform recognition of an unknown object.

Note that, in a case where all the objects included in the image have been successfully recognized, this recognition information is output to, for example, a traveling control unit for self-driving, and traveling control is performed in accordance with the recognized objects.

On the other hand, if it is determined in step S102 that an unknown object is included in the semantic map (semantic segmentation image) reconstructed in step S101, the processing proceeds to step S103.

(Step S103)

If it is determined that an unknown object is included in the semantic map (semantic segmentation image) reconstructed in step S101, scene determination processing is executed in step S103.

This processing is executed by the scene recognition unit 103 illustrated in FIG. 3.

The scene recognition unit 103 performs scene recognition processing (scene recognition) based on an image captured by the camera (stereo camera) 101.

Specifically, a type of scene in the image captured by the camera (stereo camera) 101 is recognized on the basis of the data registered as the dictionary data (learned data) 110b.

For example,
scene: street,
scene: country road,
scene: railroad crossing,
scene: highway, and
scene: inside tunnel.

For example, which of these scenes the image captured by the camera (stereo camera) 101 corresponds to is recognized.

Note that scenes may be further classified.

For example,
scene: paved road,
scene: gravel road,
scene: two-lane road,
scene: four-lane road,
scene: six-lane road,
scene: uphill, and
scene: downhill.

For example, such a scene determination may be performed.

(Step S104)

Next, in step S104, the information processor executes segmentation processing for the unknown object.

This processing is executed by the unknown object segmentation unit 104 illustrated in FIG. 3.

The unknown object segmentation unit 104 executes object segmentation processing (segmentation unknown objects) on an object on which the three-dimensional semantic map reconstruction unit 102 has failed to perform object recognition, that is, for example, the unknown object colored in black in the semantic map (semantic segmentation image) illustrated in FIG. 4B.

As described with reference to FIG. 5, the unknown object segmentation unit 104 segments a region of the unknown object colored in black into individual objects included in the region.

Specifically, the unknown object region is segmented into individual objects included in the region on the basis of, for example, image edge information, color information, and the like.

(Step S105)

Next, in step S105, the information processor executes object classification processing for each segmented region of the unknown object.

This processing is executed by the segmented region classification unit 105 illustrated in FIG. 3.

The segmented region classification unit 105 executes object recognition processing on each of the segmented regions of the unknown object created by the unknown object segmentation unit 104.

As described previously with reference to FIG. 6, the segmented region classification unit 105 performs object recognition to which the dictionary data (learned data) 110c has been applied, for the objects of the corresponding segmented regions of the unknown object created by the unknown object segmentation unit 104.

The segmented region classification unit 105 performs object recognition on the segmented regions set in the unknown object region. For example, in the example illustrated in FIGS. 4A and 4B, the following object recognition results are created.

Segmented region 1: horse
Segmented region 2: human
Segmented region 3: tire
Segmented region 4: tire Note that, as described previously, when the object recognition processing is performed on each of the segmented regions of the unknown object, it is preferable to convert the objects of the corresponding segmented regions into two-dimensional images.

It is because the amount of available dictionary data differs. Compared with the number of pieces of available dictionary data of three-dimensional images, the amount of available dictionary data of two-dimensional images is enormous.

Thus, images of the objects of the corresponding segmented regions of the unknown object are converted into two-dimensional images, and then object recognition is performed using an enormous number of pieces of two-dimensional image dictionary data. This processing enables highly accurate object recognition.

(Step S106)

Next, in step S106, the information processor creates a Bayesian network in which arrows are set on the basis of positional relationships (adjacency relationships) between objects, with the scene as a source node and the unknown object as an end node.

This processing is executed by the Bayesian network creation unit 106 illustrated in FIG. 3.

As described previously with reference to FIG. 7, the Bayesian network creation unit 106 inputs the following types of information.

(1) Scene information determined by the scene recognition unit 103

(2) Object recognition information of objects, excluding an unknown object, created by the three-dimensional semantic map reconstruction unit 102, and positional relationship information of the objects (3) Object recognition information of the unknown object created by the segmented region classification unit 105

The Bayesian network creation unit 106 creates, by applying these types of information, a Bayesian network in which a scene, recognized objects, and an unknown object are set as nodes (create baysian network).

The Bayesian network creation unit 106
sets a scene node as a source node (node 1),
an unknown object as an end node (node 5), and
an intermediate node as a node of a recognized object, and
creates a network that connects the nodes on the basis of positional relationships (adjacency relationships) between the objects.

(Step S107)

Next, in step S107, the information processor compares a configuration of the Bayesian network (BN) created in step S106 with the parameter (learned and registered BN data) stored in the storage unit, and selects the most similar registered BN data.

This processing is executed by the unknown object inference unit 107 illustrated in FIG. 3.

As described previously with reference to FIG. 8, the unknown object inference unit 107 inputs the Bayesian network created by the Bayesian network creation unit 106, and infers what the unknown object is on the basis of this Bayesian network.

This inference processing is executed using the object inference parameter (learned BN data) 115.

The object inference parameter (learned BN data) 115 is reference BN (Bayesian network) data in which a variety of objects, for example, a variety of objects such as a car, a human, or a bicycle, are expressed as Bayesian networks similar to the one described with reference to FIG. 7.

That is, the object inference parameter (learned BN data) 115 is reference BN data constituted by a Bayesian network in which a scene is set as a start node, a variety of objects such as a car, a human, or a bicycle are set as end nodes, and arrows are set on the basis of positional relationships (adjacency relationships) between node objects.

The unknown object inference unit 107 compares a Bayesian network created by the Bayesian network creation unit 106 with reference BN (Bayesian network) data registered in the storage unit as the object inference parameter (learned BN data) 115.

The unknown object inference unit 107 acquires reference BN (Bayesian network) data most similar to the Bayesian network created by the Bayesian network creation unit 106, and infers that an object set as an end node of the acquired reference BN (Bayesian network) data is the object corresponding to the unknown object.

For example, in the example illustrated in FIG. 8, among reference BNs in the object inference parameter (learned BN data) 115, the reference BN 02 is most similar to the Bayesian network created by the Bayesian network creation unit 106, that is, a Bayesian network having the following node configuration:

start node: node 1: street (scene),
node 2: road,
node 3: tire,
node 4: person, and
end node: node 5: unknown object.

As illustrated in FIG. 8, the reference BN 02 has a node configuration set as described below.

Start node: node 1: street (scene)
Node 2: road
Node 3: tire
Node 4: person
End node: node 5: car In this way, the unknown object inference unit 107 acquires the reference BN 02, which is most similar to the Bayesian network created by the Bayesian network creation unit 106, and infers that the object set as the end node of the acquired reference BN 02, that is, a "car", is the object corresponding to the unknown object.

In a case of the example illustrated in FIG. 8, the unknown object is inferred to be a "car".

The information processor of the present disclosure executes object recognition processing for the unknown object by applying the Bayesian network in this way.

Note that object recognition information thus obtained is output to, for example, a traveling control unit for self-driving, and traveling control is performed in accordance with a recognized object.

Specifically, as described previously, for example, in a case where it is inferred that the unknown object is a vehicle, the following traveling control is performed.

In a case where the object is stationary, it may start moving, so it is avoided to pass close by the object.

In a case where the object is moving, a route by which the object is expected to move is predicted, and the control is performed to set a course to a position away from the predicted route.

For example, such traveling control is performed.

[4. Example of Object Inference Processing to which Bayesian Network has been Applied for Variety of Unknown Objects]

The above-described processing of the present disclosure, that is, the processing of creating a Bayesian network corresponding to an unknown object and recognizing the unknown object can be executed for a variety of unknown objects.

A processing example in a case where a camera-captured image includes the following four types of unknown objects will be described below with reference to FIG. 10 and the following drawings.

(1) Unknown object: stroller
(2) Unknown object: bicycle
(3) Unknown object: robot car
(4) Unknown object: traffic light First, a processing example in a case where the following unknown object is included in a camera-captured image will be described with reference to FIG. 10.

(1) Unknown Object: Stroller

Figure 10:
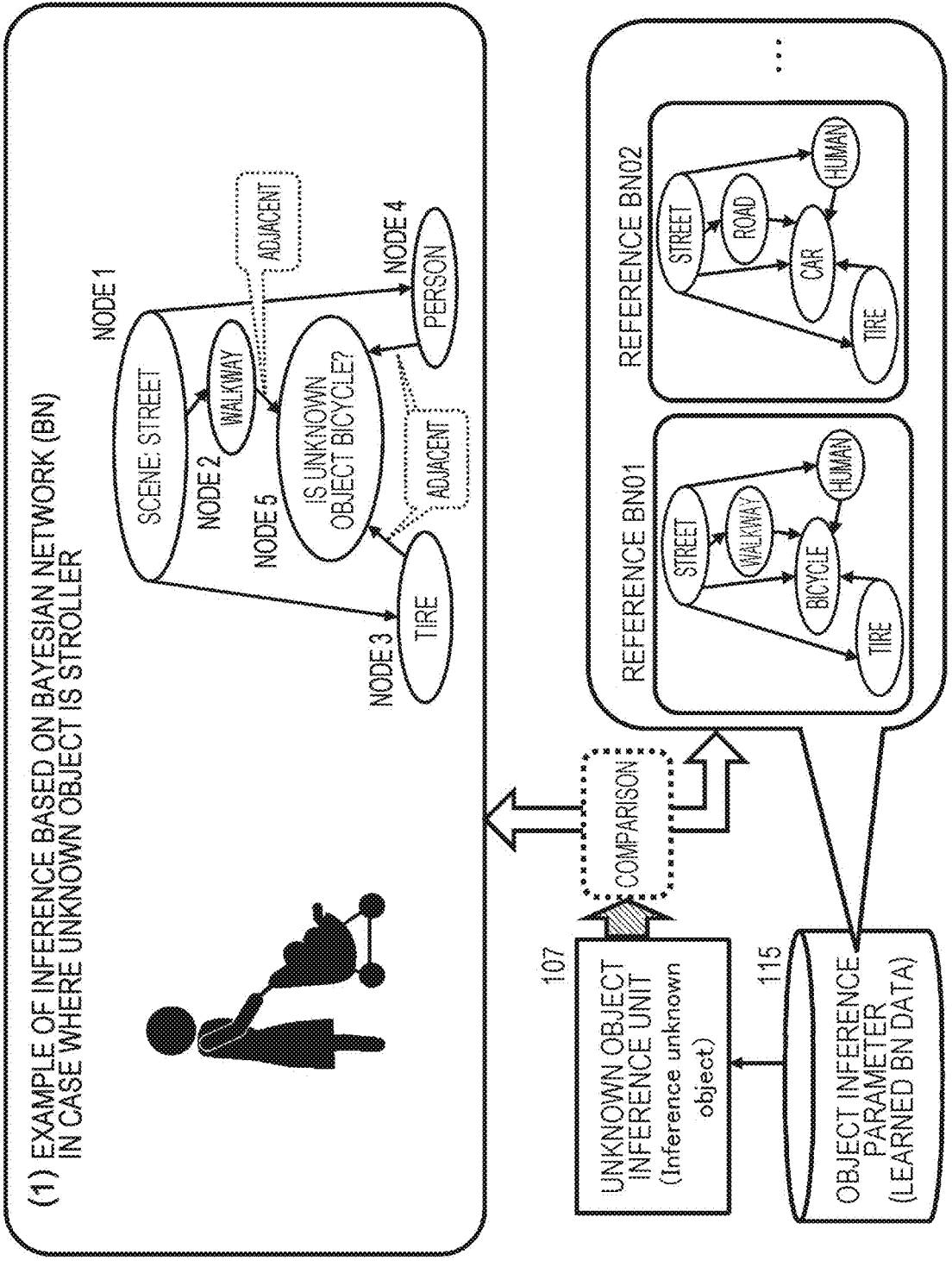
FIG. 10 is a diagram illustrating an example of object recognition processing for a variety of unknown objects.

FIG. 10 is a configuration example of a Bayesian network in a case where the unknown object is a stroller.

A case is assumed in which a stroller has been imaged as an unknown object in a captured image, and the scene is a street, for example.

Furthermore, the stroller (unknown object) is an object adjacent to a walkway.

Moreover, the stroller (unknown object) is an object adjacent to a tire and a person.

As a result, the Bayesian network creation unit 106 creates a Bayesian network constituted by the following nodes as illustrated in FIG. 10(1).

Start node: node 1: street (scene)
Node 2: walkway
Node 3: tire
Node 4: person
End node: node 5: unknown object The unknown object inference unit 107 acquires from the storage unit a reference BN that is most similar to the Bayesian network having this node configuration.

That is, the most similar reference BN is acquired from a plurality of reference BNs registered as the object inference parameter (learned BN data) 115.

In the example illustrated in FIG. 10, the most similar reference BN is a reference BN 01.

As illustrated in FIG. 10, the reference BN 01 has a node configuration set as described below.

Start node: node 1: street (scene)
Node 2: walkway
Node 3: tire
Node 4: person
End node: node 5: bicycle In this way, the unknown object inference unit 107 acquires the reference BN 01, which is most similar to the Bayesian network created by the Bayesian network creation unit 106, and infers that the object set as the end node of the acquired reference BN 01, that is, a "bicycle", is the object corresponding to the unknown object.

In this case, the unknown object is inferred to be a "bicycle".

The actual unknown object is a stroller, not the inferred object: bicycle. However, both a bicycle and a stroller are objects a collision with which must be avoided from the perspective of a person performing self-driving, and it is safe to determine that a bicycle and a stroller are of the same object type in terms of object types (categories) for performing safe self-driving.

Note that it is also possible to create reference BN data having a network configuration specific to strollers as the object inference parameter (learned BN data) 115, and then register and store the reference BN data in the storage unit.

After such reference BN data having a network configuration specific to strollers has been stored in the storage unit, it is possible to infer that the unknown object is a stroller by using this data.

Next, a processing example in a case where the following unknown object is included in a camera-captured image will be described with reference to FIG. 11.

(2) Unknown Object: Bicycle

Figure 11:
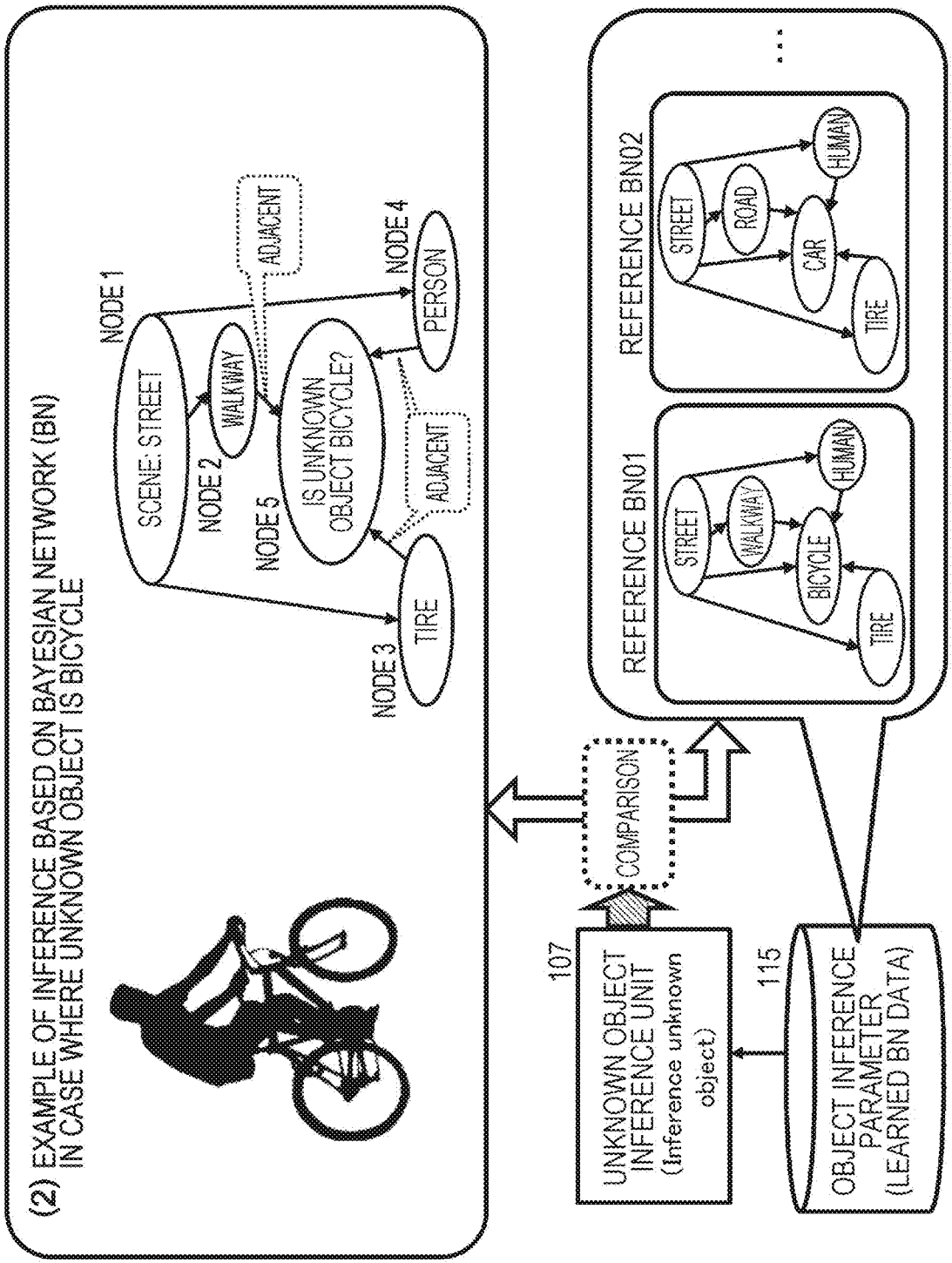
FIG. 11 is a diagram illustrating an example of object recognition processing for a variety of unknown objects.

FIG. 11 is a configuration example of a Bayesian network in a case where the unknown object is a bicycle.

A case is assumed in which a bicycle has been imaged as an unknown object in a captured image, and the scene is a street, for example.

Furthermore, the bicycle (unknown object) is an object adjacent to a walkway.

Moreover, the bicycle (unknown object) is an object adjacent to a tire and a person.

As a result, the Bayesian network creation unit 106 creates a Bayesian network constituted by the following nodes as illustrated in FIG. 11(2).

Start node: node 1: street (scene)
Node 2: walkway
Node 3: tire
Node 4: person
End node: node 5: unknown object The unknown object inference unit 107 acquires from the storage unit a reference BN that is most similar to the Bayesian network having this node configuration.

That is, the most similar reference BN is acquired from a plurality of reference BNs registered as the object inference parameter (learned BN data) 115.

In the example illustrated in FIG. 11, the most similar reference BN is the reference BN 01.

As illustrated in FIG. 11, the reference BN 01 has a node configuration set as described below.

Start node: node 1: street (scene)
Node 2: walkway
Node 3: tire
Node 4: person
End node: node 5: bicycle In this way, the unknown object inference unit 107 acquires the reference BN 01, which is most similar to the Bayesian network created by the Bayesian network creation unit 106, and infers that the object set as the end node of the acquired reference BN 01, that is, a "bicycle", is the object corresponding to the unknown object.

In this case, the unknown object is inferred to be a "bicycle".

The actual unknown object is also a bicycle, which agrees with the inferred object: bicycle.

Next, a processing example in a case where the following unknown object is included in a camera-captured image will be described with reference to FIG. 12.

(3) Unknown Object: Robot Car

Figure 12:
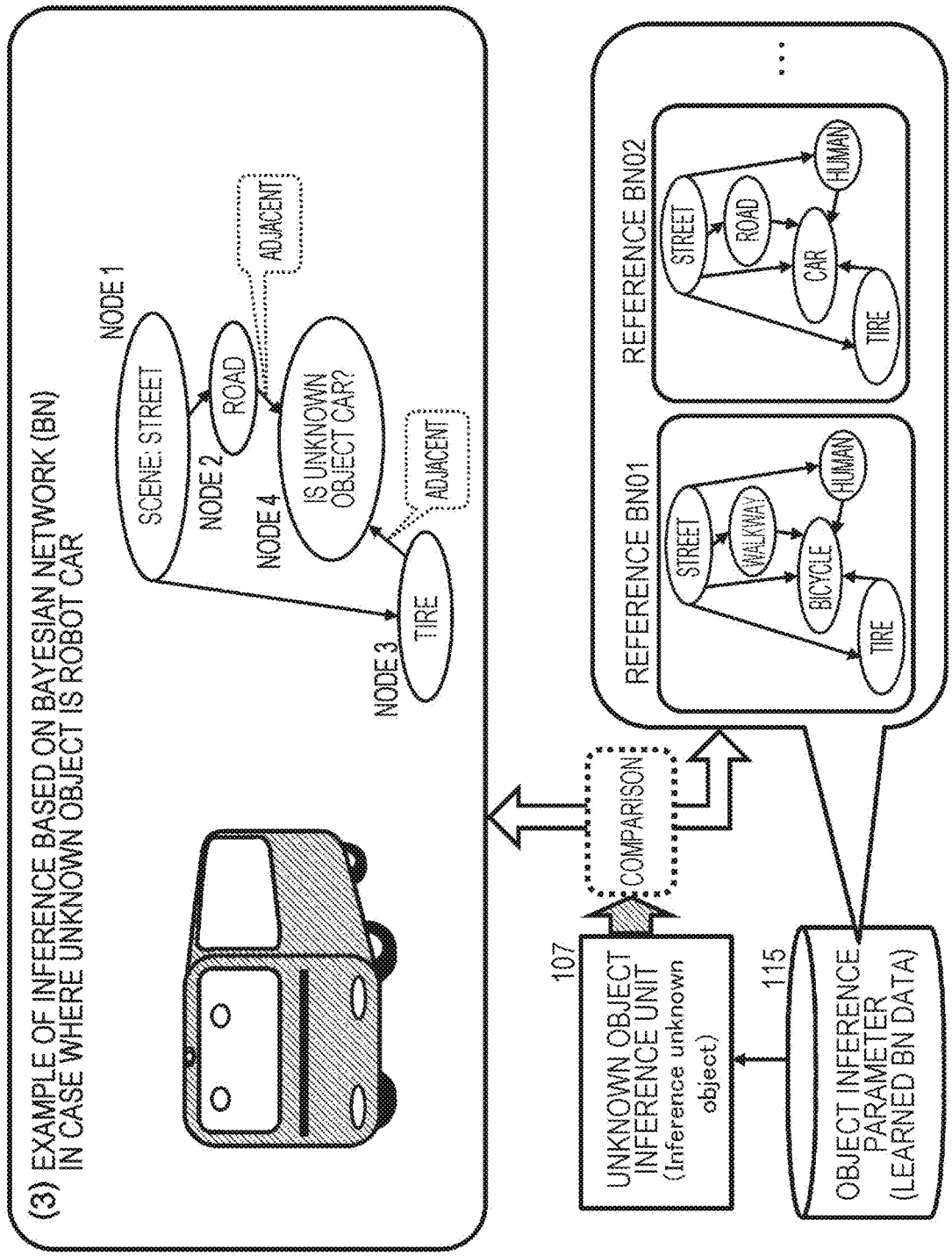
FIG. 12 is a diagram illustrating an example of object recognition processing for a variety of unknown objects.

FIG. 12 is a configuration example of a Bayesian network in a case where the unknown object is a robot car.

A case is assumed in which a robot car has been imaged as an unknown object in a captured image, and the scene is a street, for example.

Furthermore, the robot car (unknown object) is an object adjacent to a walkway.

Moreover, the robot car (unknown object) is an object adjacent to a tire and a person.

As a result, the Bayesian network creation unit 106 creates a Bayesian network constituted by the following nodes as illustrated in FIG. 12(3).

Start node: node 1: street (scene)
Node 2: road
Node 3: tire
End node: node 4: unknown object The unknown object inference unit 107 acquires from the storage unit a reference BN that is most similar to the Bayesian network having this node configuration.

That is, the most similar reference BN is acquired from a plurality of reference BNs registered as the object inference parameter (learned BN data) 115.

In the example illustrated in FIG. 12, the most similar reference BN is the reference BN 02.

As illustrated in FIG. 12, the reference BN 02 has a node configuration set as described below.

Start node: node 1: street (scene)
Node 2: road
Node 3: tire
Node 4: person
End node: node 5: car The reference BN 02 differs from the Bayesian network for a robot car illustrated in FIG. 12(3) in that node 4: person is included, but this reference BN 02 is selected as the most similar reference BN.

As a result, the object set as the end node of the acquired reference BN 02, that is, a "car" is inferred to be the object corresponding to the unknown object.

In this case, the unknown object is inferred to be a "car".

The actual unknown object is a robot car, not the inferred object: car. However, both a robot car and a car are objects a collision with which must be avoided from the perspective of a person performing self-driving, and it is safe to determine that a robot car and a car are of the same object type in terms of object types (categories) for performing safe self-driving.

Note that it is also possible to create reference BN data having a network configuration specific to robot cars as the object inference parameter (learned BN data) 115, and then register and store the reference BN data in the storage unit.

After such reference BN data having a network configuration specific to robot cars has been stored in the storage unit, it is possible to infer that the unknown object is a robot car by using this data.

Next, a processing example in a case where the following unknown object is included in a camera-captured image will be described with reference to FIG. 13.

(4) Unknown Object: Traffic Light

Figure 13:
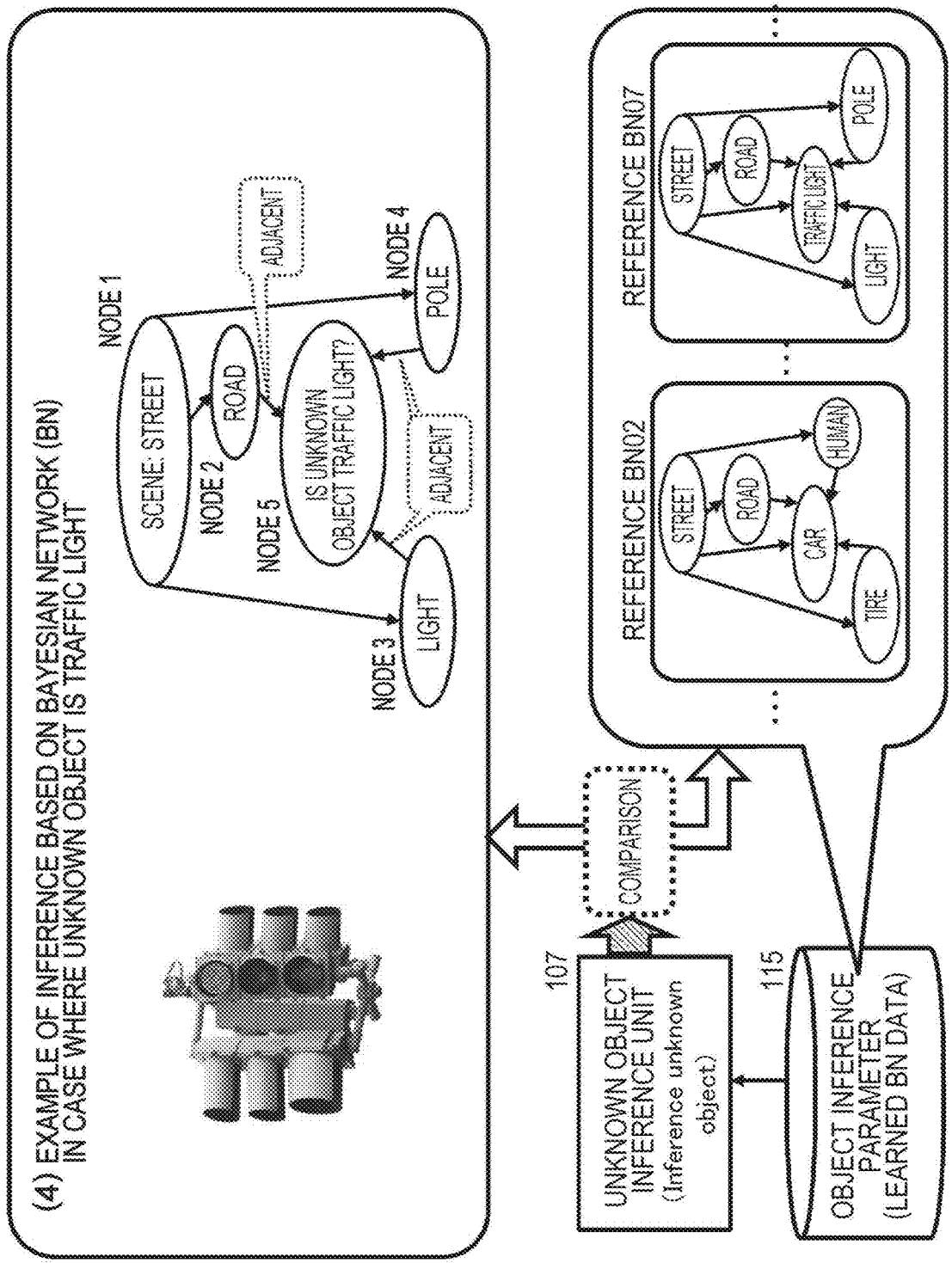
FIG. 13 is a diagram illustrating an example of object recognition processing for a variety of unknown objects.

FIG. 13 is a configuration example of a Bayesian network in a case where the unknown object is a traffic light.

A case is assumed in which a traffic light has been imaged as an unknown object in a captured image, and
the scene is a street, for example.

Furthermore, the traffic light (unknown object) is an object adjacent to a road.

Moreover,
the traffic light (unknown object) is an object adjacent to a light and a pole.

As a result, the Bayesian network creation unit 106 creates a Bayesian network constituted by the following nodes as illustrated in FIG. 13(4).

Start node: node 1: street (scene)
Node 2: road
Node 3: light
Node 4: pole
End node: node 5: unknown object The unknown object inference unit 107 acquires from the storage unit a reference BN that is most similar to the Bayesian network having this node configuration.

That is, the most similar reference BN is acquired from a plurality of reference BNs registered as the object inference parameter (learned BN data) 115.

In the example illustrated in FIG. 13, the most similar reference BN is a reference BN 07.

As illustrated in FIG. 11, the reference BN 07 has a node configuration set as described below.

Start node: node 1: street (scene)
Node 2: road
Node 3: light
Node 4: pole
End node: node 5: traffic light In this way, the unknown object inference unit 107 acquires the reference BN 07, which is most similar to the Bayesian network created by the Bayesian network creation unit 106, and infers that the object set as the end node of the acquired reference BN 07, that is, a "traffic light", is the object corresponding to the unknown object.

In this case, the unknown object is inferred to be a "traffic light".

The actual unknown object is also a traffic light, which agrees with the inferred object: traffic light.

[5. Configuration Example of Information Processor]

Next, a specific hardware configuration example of the information processor that executes the above-described processing will be described with reference to FIG. 14.

FIG. 14 is a diagram illustrating a hardware configuration example of the information processor.

A central processing unit (CPU) 301 functions as a data processing unit that executes various types of processing in accordance with a program stored in a read only memory (ROM) 302 or a storage unit 308. For example, processing according to the sequence described in the above embodiment is executed. A random access memory (RAM) 303 stores a program to be executed by the CPU 301, data, and the like. These CPU 301, ROM 302, and RAM 303 are connected to each other by a bus 304.

The CPU 301 is connected to an input/output interface 305 via the bus 304, and the input/output interface 305 is connected with an input unit 306 including various switches, a keyboard, a touch panel, a mouse, a microphone, a status data acquisition unit such as a sensor, a camera, and a GPS, and the like, and an output unit 307 including a display, a speaker, and the like. Note that the output unit 307 also outputs drive information for a drive unit of the mobile device.

The CPU 301 inputs a command, status data, and the like input from the input unit 306, executes various types of processing, and outputs a processing result to, for example, the output unit 307.

The storage unit 308 connected to the input/output interface 305 includes, for example, a hard disk and the like, and stores a program to be executed by the CPU 301 and various types of data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and records or reads data.

[6. Summary of Configuration of Present Disclosure]

The embodiment of the present disclosure has been described above in detail with reference to the specific embodiment. However, it is obvious that those skilled in the art may make modifications and substitutions to the embodiment without departing from the scope of the present disclosure. That is, the present invention has been disclosed in a form of illustration, and should not be construed as limiting. In order to determine the gist of the present disclosure, the claims should be taken into consideration.

Note that the technology disclosed in the present specification may have the following configurations.

(1) An information processor including:
a network creation unit that creates a network linking nodes corresponding to objects detected from an image; and
an unknown object inference unit that compares a created network created by the network creation unit with a large number of reference networks created by learning processing, selects reference networks similar to the created network, selects, from the selected reference networks, a node corresponding to a node of an unknown object in the created network, and infers that an object associated with the selected node is an object corresponding to the unknown object.

(2) The information processor according to (1), in which the network links a scene node indicating a scene type of an image and a node corresponding to an object.

(3) The information processor according to (1) or (2), in which the network links nodes corresponding to objects on the basis of a positional relationship between the objects.

(4) The information processor according to any one of (1) to (3), in which the network links nodes corresponding to objects on the basis of an adjacency relationship between the objects.

(5) The information processor according to any one of (1) to (4), in which the network is a Bayesian network.

(6) The information processor according to any one of (1) to (5), in which the network creation unit creates a network linking a scene node indicating a scene type of an image as a start node and an unknown object as an end node.

(7) The information processor according to any one of (1) to (6), further including:

a semantic map reconstruction unit that executes object detection processing from an image and reconstructs a semantic map that is an image color-coded by object types;

an unknown object segmentation unit that segments an unknown object region included in the semantic map into individual objects; and a segmented region classification unit that executes object recognition on segmented regions segmented by the unknown object segmentation unit, in which the network creation unit creates a network in which objects recognized by the semantic map reconstruction unit and objects of the segmented regions recognized by the segmented region classification unit are set as nodes.

(8) The information processor according to (7), in which the semantic map reconstruction unit executes object detection processing from a three-dimensional image, and reconstructs a semantic map of the three-dimensional image.

(9) The information processor according to (8), in which the segmented region classification unit converts the segmented regions segmented by the unknown object segmentation unit into two-dimensional images, and then executes object recognition.

(10) A mobile device including:

a camera that captures an image;

a network creation unit that creates a network linking nodes corresponding to objects detected from the image captured by the camera;

an unknown object inference unit that compares a created network created by the network creation unit with a large number of reference networks created by learning processing, selects reference networks similar to the created network, selects, from the selected reference networks, a node corresponding to a node of an unknown object in the created network, and infers that an object associated with the selected node is an object corresponding to the unknown object; and a control unit that executes driving control on the basis of object information inferred by the unknown object inference unit.

(11) The mobile device according to (10), in which the network links a scene node indicating a scene type of an image and a node corresponding to an object.

(12) The mobile device according to (10) or (11), in which the network links nodes corresponding to objects on the basis of a positional relationship between the objects.

(13) An information processing method to be executed in an information processor, the information processing method including:

a network creation step of creating, by a network creation unit, a network linking nodes corresponding to objects detected from an image; and an unknown object inference step of performing, by an unknown object inference unit, comparison of a created network created in the network creation step with a large number of reference networks created by learning processing, selection of reference networks similar to the created network, selection of, from the selected reference networks, a node corresponding to a node of an unknown object in the created network, and inference that an object associated with the selected node is an object corresponding to the unknown object.

(14) An information processing method to be executed in a mobile device, the information processing method including:

an image capturing step of capturing, by a camera, an image;

a network creation step of creating, by a network creation unit, a network linking nodes corresponding to objects detected from the image captured by the camera;

an unknown object inference step of performing, by an unknown object inference unit, comparison of a created network created in the network creation step with a large number of reference networks created by learning processing, selection of reference networks similar to the created network, selection of, from the selected reference networks, a node corresponding to a node of an unknown object in the created network, and inference that an object associated with the selected node is an object corresponding to the unknown object; and a control step of executing, by a control unit, driving control on the basis of object information inferred in the unknown object inference step.

(15) A program that causes information processing to be executed in an information processor, the program including:

a network creation step of causing a network creation unit to create a network linking nodes corresponding to objects detected from an image; and an unknown object inference step of causing an unknown object inference unit to compare a created network created in the network creation step with a large number of reference networks created by learning processing, select reference networks similar to the created network, select, from the selected reference networks, a node corresponding to a node of an unknown object in the created network, and infer that an object associated with the selected node is an object corresponding to the unknown object.

Furthermore, the series of processing described in the specification can be executed by hardware, software, or a combination of both. In a case of executing the processing by software, a program in which processing sequence has been recorded can be installed on a memory in a computer built in dedicated hardware and then executed, or the program can be installed on a general-purpose computer capable of executing various types of processing and then executed. For example, the program can be recorded in a recording medium in advance. Besides installing the program from a recording medium to a computer, the program can be received via a network such as a local area network (LAN) or the Internet and installed on a recording medium such as a built-in hard disk.

Note that the various types of processing described in the specification may be executed not only in chronological order in accordance with the description, but also in parallel or individually in accordance with the processing capacity of the device that executes the processing or as necessary. Furthermore, in the present specification, a system is a logical assembly constituted by a plurality of devices, and the devices constituting the assembly are not necessarily contained in the same housing.

INDUSTRIAL APPLICABILITY

As described above, the configuration of the embodiment of the present disclosure enables recognition of an unknown object included in an image.

Specifically, for example, the configuration includes a network creation unit that creates a network linking a scene node indicating a scene type of an image and a node corresponding to an object, and an unknown object inference unit that compares a created network created by the network creation unit with a large number of reference networks created by learning processing, selects reference networks similar to the created network, selects, from the selected reference networks, a node corresponding to a node of an unknown object in the created network, and infers that an object associated with the selected node is an object corresponding to the unknown object.

This configuration enables recognition of an unknown object included in an image.

REFERENCE SIGNS LIST

10 Mobile device
11 Camera
12 Dictionary data
100 Information processor
101 Camera (stereo camera)
102 Three-dimensional semantic map reconstruction unit
103 Scene recognition unit
104 Unknown object segmentation unit
105 Segmented region classification unit
106 Bayesian network creation unit
107 Unknown object inference unit
110a to c Dictionary data (learned data)
115 Object inference parameter (learned data)
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An information processor, comprising:
a network creation unit that creates a network linking nodes corresponding to objects detected from an image; and
an unknown object inference unit that
compares a created network created by the network creation unit with a large number of reference networks created by learning processing,
selects reference networks similar to the created network,
selects, from the selected reference networks, a node corresponding to a node of an unknown object in the created network, and
infers that an object associated with the selected node is an object corresponding to the unknown object.

2. The information processor according to claim 1, wherein
the network links a scene node indicating a scene type of an image and a node corresponding to an object.

3. The information processor according to claim 1, wherein
the network links nodes corresponding to objects on a basis of a positional relationship between the objects.

4. The information processor according to claim 1, wherein
the network links nodes corresponding to objects on a basis of an adjacency relationship between the objects.

5. The information processor according to claim 1, wherein
the network is a Bayesian network.

6. The information processor according to claim 1, wherein
the network creation unit creates a network linking a scene node indicating a scene type of an image as a start node and an unknown object as an end node.

7. The information processor according to claim 1, further comprising:
a semantic map reconstruction unit that executes object detection processing from an image and reconstructs a semantic map that is an image color-coded by object types;
an unknown object segmentation unit that segments an unknown object region included in the semantic map into individual objects; and
a segmented region classification unit that executes object recognition on segmented regions segmented by the unknown object segmentation unit,
wherein the network creation unit
creates a network in which objects recognized by the semantic map reconstruction unit and objects of the segmented regions recognized by the segmented region classification unit are set as nodes.

8. The information processor according to claim 7, wherein
the semantic map reconstruction unit
executes object detection processing from a three-dimensional image, and reconstructs a semantic map of the three-dimensional image.

9. The information processor according to claim 8, wherein the segmented region classification unit
converts the segmented regions segmented by the unknown object segmentation unit into two-dimensional images, and then executes object recognition.

10. A mobile device, comprising:
a camera that captures an image;
a network creation unit that creates a network linking nodes corresponding to objects detected from the image captured by the camera;
an unknown object inference unit that compares a created network created by the network creation unit with a large number of reference networks created by learning processing, selects reference networks similar to the created network,
selects, from the selected reference networks, a node corresponding to a node of an unknown object in the created network, and infers that an object associated with the selected node is an object corresponding to the unknown object; and
a control unit that executes driving control on a basis of object information inferred by the unknown object inference unit.

11. The mobile device according to claim 10, wherein the network links a scene node indicating a scene type of an image and a node corresponding to an object.

12. The mobile device according to claim 10, wherein the network links nodes corresponding to objects on a basis of a positional relationship between the objects.

13. An information processing method to be executed in an information processor, the information processing method comprising:
a network creation step of creating, by a network creation unit, a network linking nodes corresponding to objects detected from an image; and
an unknown object inference step of performing, by an unknown object inference unit,
comparison of a created network created in the network creation step with a large number of reference networks created by learning processing, selection of reference networks similar to the created network,
selection of, from the selected reference networks, a node corresponding to a node of an unknown object in the created network, and inference that an object associated with the selected node is an object corresponding to the unknown object.

14. An information processing method to be executed in a mobile device, the information processing method comprising:
an image capturing step of capturing, by a camera, an image;
a network creation step of creating, by a network creation unit, a network linking nodes corresponding to objects detected from the image captured by the camera;
an unknown object inference step of performing, by an unknown object inference unit,
comparison of a created network created in the network creation step with a large number of reference networks created by learning processing, selection of reference networks similar to the created network,
selection of, from the selected reference networks, a node corresponding to a node of an unknown object in the created network, and inference that an object associated with the selected node is an object corresponding to the unknown object; and
a control step of executing, by a control unit, driving control on a basis of object information inferred in the unknown object inference step.

15. A non transitory computer readable medium having stored thereon, computer readable instructions that when executed by an information processor, cause the information processor to execute operations, the operations comprising:
a network creation step of causing a network creation unit to create a network linking nodes corresponding to objects detected from an image; and
an unknown object inference step of causing an unknown object inference unit to
compare a created network created in the network creation step with a large number of reference networks created by learning processing, select reference networks similar to the created network,
select, from the selected reference networks, a node corresponding to a node of an unknown object in the created network, and infer that an object associated with the selected node is an object corresponding to the unknown object.

\* \* \* \* \*